United States Patent
Takahashi et al.

(10) Patent No.: US 7,145,519 B2
(45) Date of Patent: Dec. 5, 2006

(54) IMAGE DISPLAY APPARATUS, METHOD, AND PROGRAM FOR AUTOMOTIVE VEHICLE

(75) Inventors: Toshiaki Takahashi, Yokohama (JP); Hirofumi Inoue, Kanagawa (JP); Yasuhide Yamamoto, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 232 days.

(21) Appl. No.: 10/392,844

(22) Filed: Mar. 21, 2003

(65) Prior Publication Data

US 2003/0197660 A1    Oct. 23, 2003

(30) Foreign Application Priority Data

Apr. 18, 2002 (JP) ............................. 2002-116039
May 24, 2002 (JP) ............................. 2002-151143

(51) Int. Cl.
    *G09G 5/00* (2006.01)
(52) U.S. Cl. .............................. 345/7; 348/148; 701/36
(58) Field of Classification Search ................ 345/7–9; 348/118, 143, 148; 701/36; 340/435, 901
    See application file for complete search history.

(56) References Cited

U.S. PATENT DOCUMENTS 6,346,942 B1    2/2002   Endo et al.
6,498,620 B1 *  12/2002  Schofield et al. ............ 348/148
2003/0137586 A1 *  7/2003  Lewellen ...................... 348/148
2003/0179293 A1 *  9/2003  Oizumi ......................... 348/148

FOREIGN PATENT DOCUMENTS

| EP | 1 158 473    | 11/2001 |
| EP | 2002081941   | 3/2002  |
| EP | 1 197 937    | 4/2002  |
| JP | 11-151975    | 6/1999  |
| WO | WO 00/64175  | 10/2000 |

* cited by examiner

*Primary Examiner*—Regina Liang
(74) *Attorney, Agent, or Firm*—McDermott Will & Emery LLP

(57) ABSTRACT

In image display apparatus, method, and program for an automotive vehicle, a surrounding of the vehicle is photographed, a plurality of display images are generated from a photographed data supplied from a photographing section, viewing points of the respective display images and looking down angles thereof being different from one another, one of the images generated is displayed through a display, and the display image generated and displayed through the display is switched to another one of the generated display images.

17 Claims, 23 Drawing Sheets

K  10(P)  g

IMAGE DISPLAY APPARATUS, METHOD, AND PROGRAM FOR AUTOMOTIVE VEHICLE

BACKGROUND OF THE INVENTION

1. Field of the Invention

The present invention relates to image display apparatus, method, and program for an automotive vehicle which are capable of displaying the vehicle and a surrounding of the vehicle viewed from an upper sky through a looking down angle that the vehicle driver desires.

2. Description of the Related Art

A Japanese Patent Application First Publication No. Heisei 11-151975 published on Jun. 8, 1999 exemplifies a previously proposed image display apparatus for an automotive vehicle in which an image surrounding the vehicle is photographed by a camera equipped within the vehicle is displayed within a vehicular passenger compartment in order to assist an operation of the vehicle during an entrance of the vehicle in a parking lot or garage.

It is possible to display directly the image photographed by the camera through a display in the previously proposed display apparatus. However, a viewing point of the camera is transferred to an upper sky above the vehicle. Then, a top view image looking down to the vehicle substantially vertically is tried to be displayed on the display. The top view image displays the vehicle substantially vertically from the upper sky. Hence, in a case where the vehicle parks a predetermined parking space, it is advantageously easy to recognize a positional relationship between the parking space and the vehicle.

SUMMARY OF THE INVENTION

However, the top view image is an image whose viewing point of the camera equipped within the vehicle is moved to the upper sky over the vehicle, a distortion due to a deviation of the viewing point is included. In addition, in a case where a three-dimensional vehicle with a height is projected onto a mounting plane (ground surface and soon) of the vehicle, a distortion in a height direction becomes remarkable and there is a disadvantage that a stereoscopic sense of distance is difficult to be grasped. Especially, in a case where the driver drives the vehicle avoiding such obstacles as other vehicle, motor bicycle, or bicycle, there is an inconvenience that a position of any obstacle is not easily recognized from the top view image.

That is to say, in a case where the vehicle is parked at a predetermined parking space while confirming the position of the vehicle, the top view image is appropriate. However, the vehicle is advanced avoiding a collision against an obstacle while measuring a three-dimensional (stereoscopic) distance from the obstacle to the vehicle. In this situation, the display of the top view image is inappropriate. As described above, the display of only the top view image cannot sufficiently assist a driver's manipulation on the vehicle.

Furthermore, in the previously proposed image display apparatus, when the image of the camera as viewed from the exact upper sky is perspectively transformed into the image viewed from the viewing point having a height near to an infinity, the image is not transformed to the image viewed from the right upper sky. Consequently, a distorted image is displayed.

It is, therefore, an object of the present invention to provide image display apparatus, method, and program for an automotive vehicle in which the display of one of a plurality of display images, viz., a top view image and that of a bird's eye view image are switched therebetween to display the image suitable for the assistance of the driver's manipulation and which are, preferably, capable of displaying the image surrounding the vehicle viewed from the upper sky without image distortion.

In image display apparatus, method, and program according to the present invention, at least one of a top view (or called, a plane view) image approximately vertically looking down to the vehicle from a first viewing point located above the upper sky just above the vehicle and a bird's eye view (or called, a perspective view) slightly obliquely looking down the vehicle from a second viewing point located above the upper sky above the vehicle is generated and the top view image and bird's eye view image are switched therebetween and displayed in accordance with a running information related to a received vehicular running situation. It is noted that the running information used in the whole specification is an information related to a direction toward which the vehicle runs, viz., the vehicle runs in a forward direction, the vehicle runs in a backward direction, or the vehicle stops, an information related to a history of the direction toward which the vehicle moves, viz., the vehicle stops after the vehicle runs in the forward direction or the vehicle stops after the vehicle runs in the backward direction, an information on whether the vehicle is running at a speed equal to or higher than a predetermined value of speed, or any other information related to the vehicular running situation. The image display apparatus, method, and program according to the present invention selectively displays the image suitable for assisting the operation of the vehicle driver according to such a running information as described above. That is to say, when the vehicle is running in the backward direction, there is a high possibility of manipulating the vehicle for the vehicle to be parked by the driver. At this time, the top view image to objectively display a positional relationship between a predetermined parking space and vehicular positional relationship is displayed. On the other hand, when the vehicle is running in the forward direction, there is a high possibility of driving the vehicle so as to avoid a collision against an obstacle such as another vehicle. Hence, the bird's eye view image easy to grasp a stereographic sense of three-dimensional distance is displayed. In this way, since the display of one of the top view image and the bird's eye view image is switched according to the running situation of the vehicle, one of the images appropriate for the driver's vehicular manipulation assistance can be displayed.

According to a first aspect of the present invention, there is provided an image display apparatus for an automotive vehicle, comprising: a photographing section that photographs a surrounding of the vehicle; a display image generating section that generates a plurality of display images from a photographed data supplied from the photographing section, viewing points of the respective display images and looking down angles thereof being different from one another; a display section through which one of the images generated by the display image generating section is displayed; and a display image switching section that switches the display image generated by the display image generating section and displayed through the display section to another one of the display images generated thereby.

According to a second aspect of the present invention, there is provided an image display apparatus for an automotive vehicle, comprising: a photographing section that photographs a surrounding of the vehicle; a display image generating section that generates a plurality of display images from a photographed data supplied from the photographing section, viewing points of the respective display images and looking down angles thereof being different from one another; a display section through which one of the images generated by the display image generating section is displayed; a display image switching section that switches the display image generated by the display image generating section and displayed through the display section to another one of the display images generated thereby; a surrounding vehicle detecting section that detects a surrounding vehicle to the vehicle from the photographed data; and a pseudo vehicular image drawing section that draws a pseudo vehicular image, and wherein the display image generating section generates the images with which the pseudo vehicular image is synthesized.

According to a third aspect of the present invention, there is provided an image display method for an automotive vehicle, comprising: receiving photographed data on a surrounding of the vehicle; receiving a running information related to a vehicular running situation; generating a plurality of display images from the photographed data, viewing points of the respective display images and looking down angles thereof being different from one another; displaying one of the generated images; and switching the display image generated and displayed through a display to another one of the generated display images in accordance with the running information related to the vehicular running situation.

According to a fourth aspect of the present invention, there is provided an image display method for an automotive vehicle, comprising: photographing a surrounding of the vehicle; generating a plurality of display images from a photographed data supplied at the photographing of the surrounding of the vehicle, viewing points of the respective display images and looking down angles thereof being different from one another; displaying one of the generated images; switching the display image generated and displayed through a display to another one of the generated display images; detecting a surrounding vehicle to the vehicle from the photographed data; and drawing a pseudo vehicular image, and wherein the images with which the pseudo vehicular image is synthesized are generated.

According to a fifth aspect of the present invention, there is provided an image display program for an automotive vehicle, comprising: having a computer mounted in the vehicle receive a photographed data on a surrounding of the vehicle through at least one camera disposed on the vehicle; receive a running information related to a vehicular running situation; switch a position of a predetermined viewing point at an upper sky above the vehicle and a looking down angle from the viewing point; generate a display image which displays the vehicle from the predetermined viewing point with the predetermined looking down angle on the basis of the received photographed data; and execute an output of the display image to a display.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

First Embodiment

Figure 1:
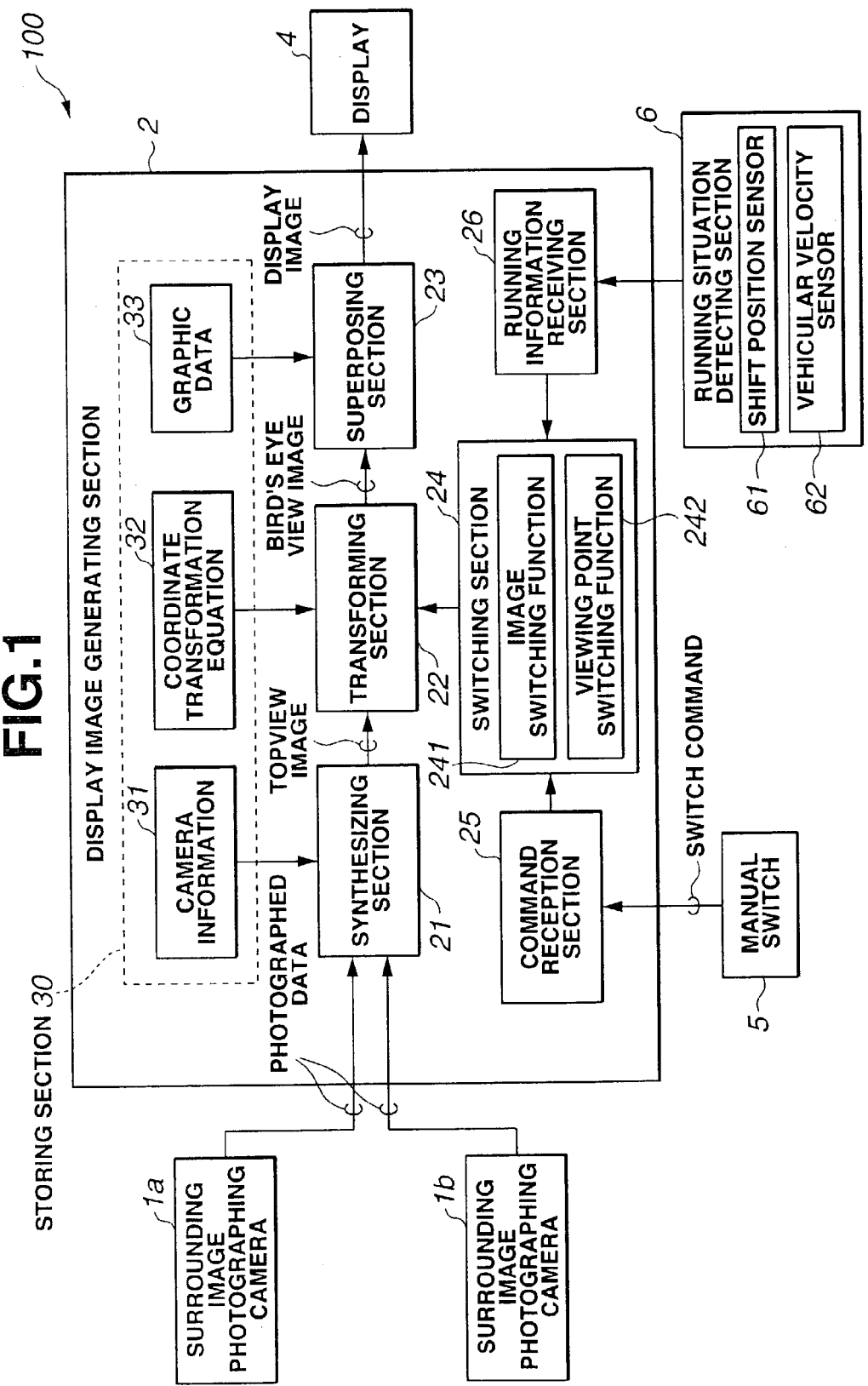
FIG. 1 is a functional block diagram of an image display apparatus for an automotive vehicle in a first preferred embodiment according to the present invention.
Figure 2:
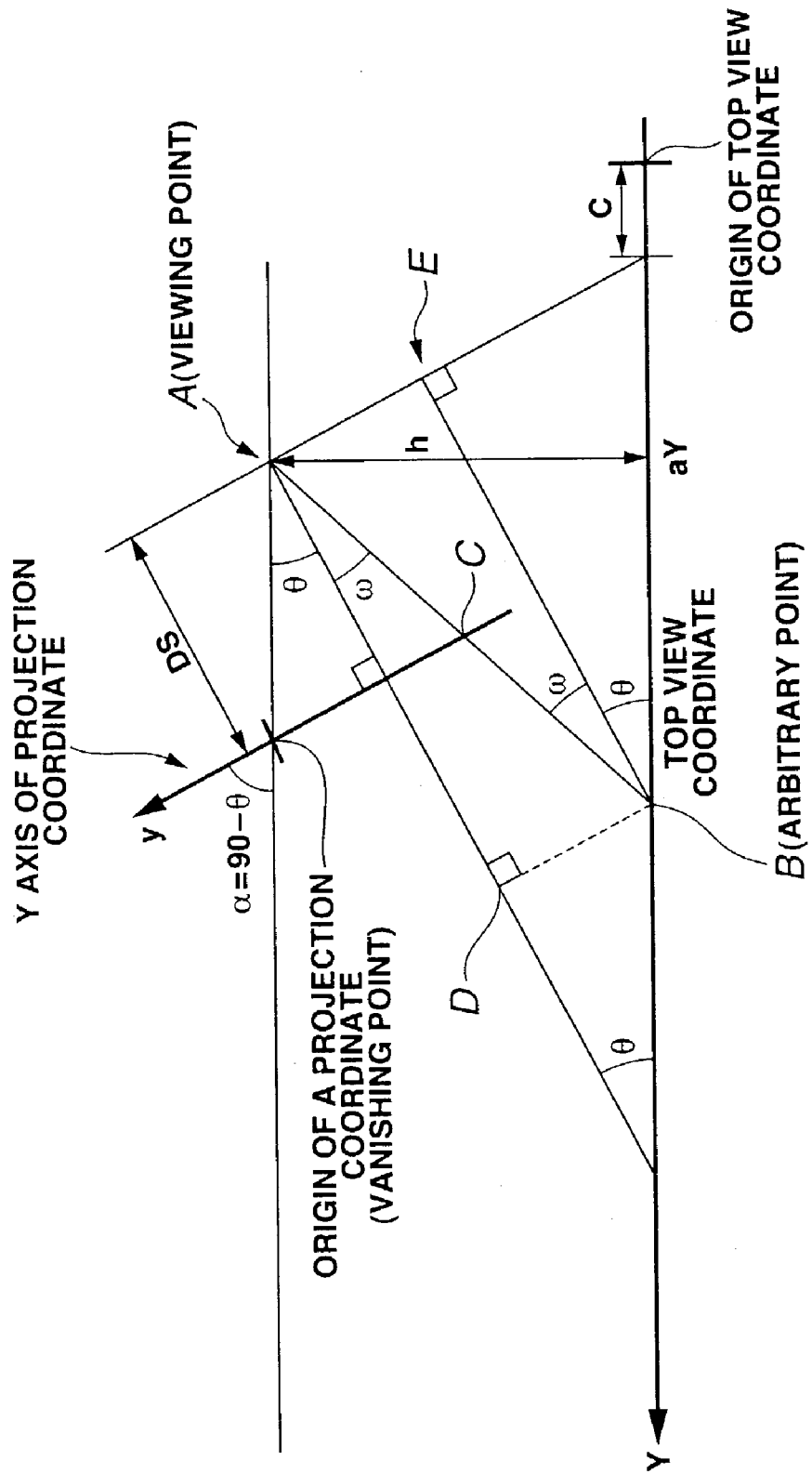
FIG. 2 is a first explanatory view for explaining a transformation process from a top view image to a bird's eye view image.
Figure 3:
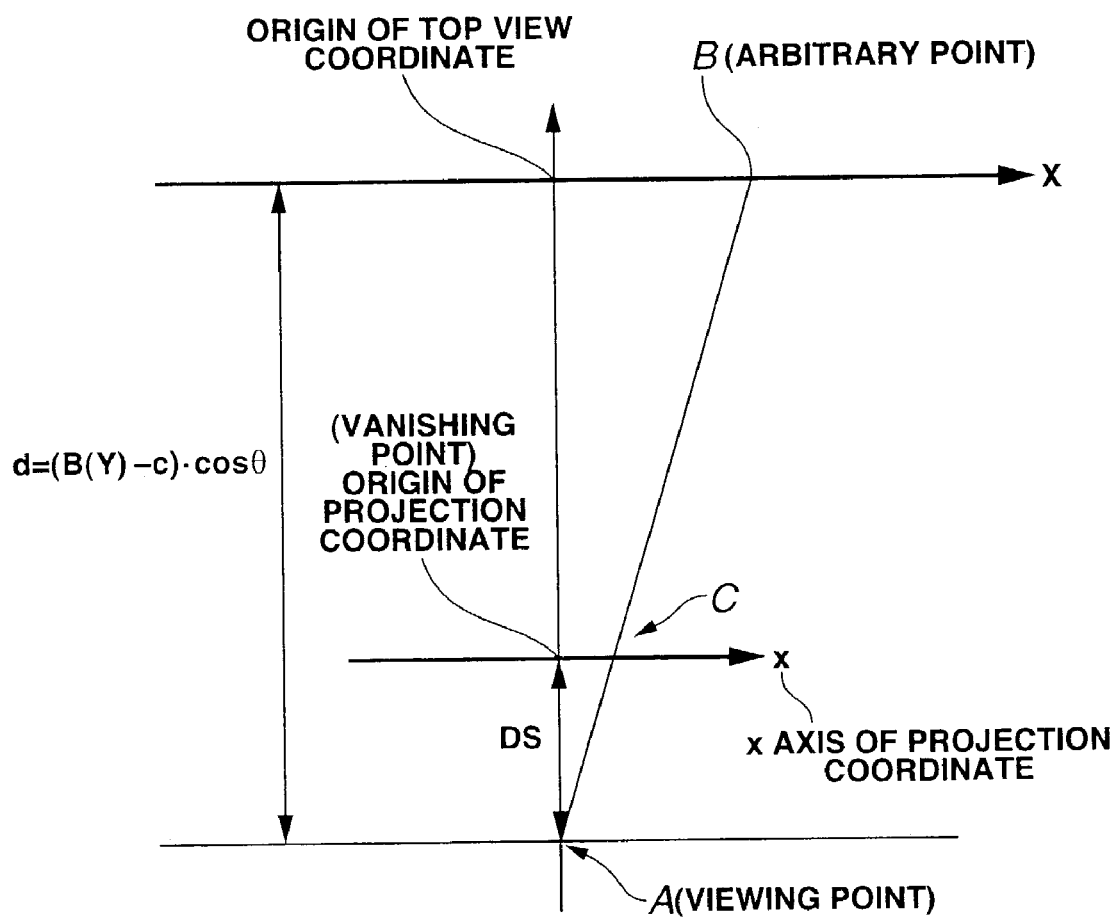
FIG. 3 is a second explanatory view for explaining the transformation process from the top view image to the bird's eye view image.

A vehicular image display apparatus 100 in a first preferred embodiment according to the present invention is an apparatus in which an image of an automotive vehicle and a surrounding of the vehicle looking down from a viewing point located at an upper sky above the vehicle is displayed on a display 4 installed within a vehicular passenger compartment. FIG. 1 shows a block diagram of the image display apparatus in the first preferred embodiment according to the present invention. FIGS. 2 and 3 show explanatory views for explaining a transform process from a top view image (a whole vehicular image, or plan view image) into a bird's eye view image (FIG. 2 corresponds to a Y-axis direction transformation process and FIG. 3 corresponds to an X-axis direction transformation process). As shown in FIG. 1, in the first preferred embodiment, image display apparatus 100 includes: a plurality of cameras (1a, 1b, - - -) photographing the vehicle and the surrounding of the vehicle; a display image generating (producing) section 2 which generates display images from the photographed data photographed by cameras 1a, 1b, - - -; and a display 4 which displays the prepared display image. Camera 1a, 1b, - - -, disposed at an outside of the vehicle to photograph the surrounding of the vehicle and to obtain the photograph data. An arrangement of cameras 1a, 1b, - - - and the number of cameras 1a, 1b, - - - are, specifically, not limited. Cameras 1 (1a, 1b, - - -) may be constituted by optical cameras having lens systems. In the first embodiment, digital cameras having CCD (Charge Coupled Device) devices are adopted as surrounding photographing cameras 1a and 1b. The photographed data are supplied to display image generating section 2.

Image generating section 2 generates the bird's eye view (perspective view) on which the vehicle is projected from a predetermined viewing point located at an upper sky above the vehicle on the basis of the photographed data retrieved (received) from cameras 1a, 1b, - - -. In this embodiment, the term of the top view image means an image looking down substantially vertically to the vehicle from a predetermined viewing point (a first viewing point) located at the upper sky just above the vehicle. On the other hand, the bird's eye view means a perspective view image looking down of the vehicle in an oblique direction from the upper sky above the vehicle. Specifically, the bird's eye view image is an image looking down of the vehicle through a looking down angle from a predetermined viewing point (a second viewing point) of the upper sky above the vehicle. This second viewing point is a point of the first predetermined point moved in a forward direction or a rearward direction with respect to a vehicular movement direction.

Display image generating section 2 includes a microcomputer having: a CPU (Central Processing Unit); ROM (Read Only Memory); and RAM (Random Access Memory). That is to say, the ROM stores a program or firmware therein. The CPU functions as display image generating section 2 by executing the program stored in the ROM. The RAM serves as a memory (storing) section 30. It is of course that the CPU, the ROM, and RAM may be constituted by a logic circuit(s). Specifically, display image generating section 2 is provided with storing section 30. Furthermore, this storing section 30 includes a region storing camera information 31, a region storing coordinate transformation equation 32, and a region storing a graphic data 33. This camera information 31 is an information necessary when the whole image is synthesized from the photographed data by means of a synthesizing section 21. The camera information 31 includes an information on mounting positions, photographing directions, and photographed angles of cameras 1a, 1b, - - -, the lens information, and CCD device related information. Coordinate transformation equation 32 is an equation required for the coordinate transforming section 22 to transform the top view image into the bird's eye view image. This transformation equation includes the information related to the top view image, the position of the viewing point of the bird's eye view image, the looking down angle from the viewing point, a position of a projected plane (including an angle between the projection plane and mounted plane of the vehicle), and the information requiring the other transformation or required information to derive coordinate transformation equation 32. Graphic data 33 is an image information in an arrow mark shape indicating visually the direction toward which the vehicle moves, the image information expressing stereographically and visually the vehicle from the predetermined viewing point through a predetermined projection angle, and an image information expressing stereographically or flatly a reference line net. Storing section 30 previously stores arrow mark graphic data k, k' in an arrow marked form representing the direction toward which the vehicle moves, vehicular graphic data p, p' representing stereographically the vehicle in accordance with the viewing point and projection plane, and a top view image grid line g or a bird's eye view image grid line g' therein.

In addition, display image generating section 2 includes: a synthesizing section 21 which synthesizes the top view image substantially vertically looking down the vehicle from the first viewing point located at the upper sky above the vehicle according to a plurality of photograph data retrieved (received) from cameras 1a and 1b; a transforming section 22 that transforms the top view image described above into the bird's eye view looking down the vehicle through a predetermined looking down angle from the second viewing point with the first viewing point of the top view image moved into a front area of the vehicular forwarding direction or a rearward area of the forward direction of the vehicle; and a superposing section 23 that superposes the graphic data 33 on the bird's eye view image transformed by transforming section 22. Display image generating section 2 determines whether the top view image should be transformed into the bird's eye view image. In order to switch the display image between the bird's eye view image and the top view image, image generating section 2 includes: a switching section 24 which controls a transformation process of transforming section 22; a command accepting (reception) section 25 which receives a vehicle driver's command from an external manual switch 5 and transmits the corresponding command signal to switching section 24; and a running information receiving section 26 which transmits the running information received from an external running situation detecting section 6 to switching section 24.

In other words, manual switch 5 receives a command on the display of the image issued by the vehicle driver. Such a command as described above includes a switching command on the display image such as "display the top view image", "display the bird's eye view image", and "display the image with the viewing point as A and the looking down angle as B" and a switch command of the display mode such as "display the bird's eye view image during the vehicular run in the forwarding direction and display the top view image during the vehicular run in the backward direction" and "display the bird's eye view image during the vehicular run in the backward direction and display the top view image during the forward direction of the vehicle". The form of the switching command is not limited to this.

Running situation detecting section 6 retrieves (receives) the running information related to the running situation of the vehicle. The running information in this embodiment is an information related to an operation of a shift position (automatic transmission select lever) of the vehicle and its operation history and uses a shift position signal detected by a shift position detecting section 61. According to the shift position signal, the forwarding or reversing of the vehicle and a history of the forwarding direction and rearward direction such as a case where the vehicle stops after the vehicle runs in the forwarded direction or where the vehicle is stopped after the vehicle runs in the backward direction can be retrieved (received).

Herein, a more detailed explanation of the structure and function of display image generating section 2 will be described below. Display image generating section 2 includes: synthesizing section 21; transformation (transforming) section 22; switching section 24; and superposing section 23, as shown in FIG. 1.

Synthesizing section 21 retrieves (obtains) each photograph data photographed by means of each camera 1a, 1b, - - - . Synthesizing section 21 synthesizes the photographed data in accordance with a photograph range of each camera 1a, 1b, - - - into a single integrated top view image representing the vehicular surrounding. This top view image is an image approximately vertically looking down to the vehicle from the predetermined first viewing point located at the upper sky above the vehicle. In this case, synthesizing section 21 reads the camera information 31 from storing section 30 and synthesizes the top view image on the basis of the camera information 31 and photographed data. It is noted that the viewing point of the previously set top view image is not limited specifically provided that it is located at an upper sky above the vehicle.

Transforming section 22 transforms the top view image synthesized by synthesizing section 21 into the bird's eye view image. The bird's eye view image is an image looking down to the vehicle through a predetermined looking down angle from the second viewing point located above the upper sky of the vehicle. The position of the second viewing point on the bird's eye view image is not limited specifically. However, the position of the second viewing point is a position at which a forwarding direction or rearward direction of the vehicle is moved with respect to the first viewing point of the top view image. In addition, the projection plane over which the looked down vehicle is projected has a predetermined angle α (0<α≦90°) with respect to the vehicular mounting plane and is preferably a plane having a gradient with respect to a vehicular mounting plane (road surface, ground surface, and parking plane). This is because a distortion in a height direction of the vehicle in the bird's eye view image is relieved. Angle α is not limited but is determined according to the position of the viewing point.

This angle α is determined according to the position of the viewing point. In the first embodiment, a plane perpendicular to a looking down direction from a predetermined viewing point is the projection plane. Specifically, if the looking down direction from a predetermined viewing point is an angle θ with respect to the mounting plane of the vehicle, the projection plane has an angle of α=90°−θ with respect to the mounting plane of the vehicle.

It is noted that an example of transformation process from the top view image to the bird's eye view image by means of transformation section 22 will be described with reference to FIGS. 2 and 3.

In this transformation process example, the top view image (an image looking down to the vehicle from the upper sky above the vehicle) synthesized, with the predetermined position of the upper sky above the vehicle as a viewing point (first viewing point), is transformed into the bird's eye view image (an image looking down through a predetermined looking down angle) with another predetermined point on the upper sky above the vehicle (the image looked down through the predetermined looking down angle from the second viewing point).

In order to transform an arbitrary point B on the coordinate (upper surface viewing point) of the top view image shown in FIG. 2 into the point C on the coordinates of the bird's eye view image, a relationship between points of the top view coordinates and of the bird's eye view coordinates will be introduced.

First, the coordinate transform in the Y-axis direction will be described with reference to FIG. 2. The axis denoted by Y is a Y coordinate axis at the top view coordinates. A point A shown in FIG. 2 represents a position of the viewing point of the bird's eye view image. In FIG. 2, h denotes a height in the top view coordinate of the viewing point and θ denotes a looking down angle from the viewing point.

An axis y denoted by y is a y coordinate axis in the bird's eye view coordinates, prescribing the y axis of the projection plane (a plane on which the bird's eye view is viewed) projected with the top view image transformed. The projection plane is set at a position away from a predetermined distance DS from the viewing point A. Distance DS is determined according to a magnitude of the display image displayed via a display 4.

A y coordinate value C(y) at a point C projected in the bird's eye view coordinates C(y) is calculated from arbitrary point B on the top view coordinate system as follows:

$$C(y) = -DS \cdot \tan \theta - DS \cdot \tan \omega \qquad (1)$$

$$= -DS(\tan \theta + \tan \omega) \qquad (2).$$

DS: a distance from viewing point A to a projection plane, θ denotes an angle looking down from viewing point A, and ω denotes an angle formed between a line of sight looked down from viewing point A through an angle of θ to a line segment AB.

On the other hand, Y coordinate value B(Y) at an arbitrary point C on the top view coordinates is as follows:

$$B(Y) = \{h/\sin(\theta+\omega)\} \cdot (\cos \omega / \cos \theta) + C \qquad (3).$$

In equation (3), h denotes a height of each camera, a denotes a margin of the image (preset value).

If equation (3) is arranged, the following equation (4) is satisfied:

$$B(Y) = \{h/(\tan \theta + \tan \omega)\} \cdot (1/\cos^2 \theta) + c \qquad (4).$$

From equations (1) and (4), the following equation is obtained:

$$B(Y)=(-h \cdot DS/\cos^2\theta)\cdot(1/C(y))+c \quad (5).$$

It is noted that, if $$b=h \cdot DS/\cos^2\theta \quad (6),$$

equation (5) can be arranged as follows:

$$B(Y)=(-b/C(y))+c \quad (7).$$

A mutual transformation between point B (Y) on the top view image and point C(y) on the bird's eye view image can be obtained.

Next, the transformation of the coordinates in the X axis direction will be explained with reference to FIG. 3.

An axis denoted by X is an X coordinate axis in the top view coordinate of the top view image. In addition, an axis denoted by x is an x coordinate axis in the bird's eye view image. Now, x coordinate value C(x) of a projection point C onto which an arbitrary point B on the top view coordinate is projected on the bird's eye view coordinate is derived. A ratio between a distance d from viewing point A to an X axis of the top view coordinate including arbitrary point B and X coordinate value (top view coordinate) of arbitrary point B is equal to the ratio between DS and x coordinate value C(x) of projected point C. Hence, $$B(X)/d=C(x)/DS \quad (8).$$

It is noted that d corresponds to a distance between viewing point A of FIG. 2 and a point D of FIG. 2. This distance denoted by AD is the same as the distance from arbitrary point B and point E and is expressed as d=(B(Y)−c)cos θ. If d is substituted into equation (8), equation (8) can be expressed as:

$$B(X)=(\cos\theta/DS)\cdot C(x)\cdot(-b/C(y)) \text{ and } B(X)=-b\cdot(\cos\theta)/DS)\cdot(C(x)/C(y)) \quad (10).$$

Herein, if $$a=b\cdot(\cos\theta/DS),\ B(X)=-a\cdot(C(x)/C(y)) \quad (11).$$

Thus, arbitrary point B(X) on the top view coordinate can be transformed to port C(x) on the bird's eye view. Then, in each constant of a, b, and c, specific numerical values are substituted and C(x, y) in the bird's eye view coordinate is derived from B(X, Y).

In accordance with a determination by switching section 24 that the bird's eye view image should be displayed, the top view image is transformed into the bird's eye view image and supplied to superposing section 23. On the other hand, in a case where switching section 24 determines that the top view image is to be displayed, transforming section 22 supplies the top view image directly to the superposing section 23 without coordinate transformation. It is of course that the top view image may be supplied from synthesizing section 21 to superposing section 23 without intervention of transforming section 22.

Next, switching section 24 will be described in more details. Switching section 24 determines a formation of the displayed image which displays in accordance with the running situation of the vehicle and controls the transformation process of transforming section 22 to switch the display of the image. That is to say, in the case where the top view image is displayed, the top view image synthesized by synthesizing section 21 is not transformed into the bird's eye view image but is supplied directly to superposing section 23 to display the top view image through display 4. On the other hand, in the case where the bird's eye view image is displayed, transforming section 22 transforms the top view image into the bird's eye view image and the bird's eye view image is displayed on display 4 via superposing section 23.

Switching section 24 retrieves (accepts) the running information via running information receiving section 6 when the switching process is carried out. The running information includes a running information related to a vehicular forwarding direction retrieved from shift position sensor 61 and the running information related to a vehicular running velocity (received) retrieved from vehicle velocity sensor 62. In a case where the image to be displayed is switched in accordance with the running direction, the image is switched according to whether the vehicle is running in the forward direction or in the backward direction, or according to a history of whether the vehicle has stopped after the vehicle has run in the forwarded direction or the vehicle has stopped after the vehicle has run in the backward direction or any other history of vehicular run and stop. In addition, in a case where the image to be displayed in accordance with the running velocity (vehicular velocity) is switched, the image is switched depending upon whether the running velocity of the vehicle is equal to or higher than a predetermined value of S or lower than S. The predetermined value of S is stored into storing section 30. The predetermined value of S is not specifically limited if the running situation of the vehicle can be determined. For example, in a case where the vehicle runs at a speed range of 5 Km/h through 15 Km/h, it is predicted that the driver drives the vehicle confirming the positional relationship of the vehicle and surrounding the vehicle. In this case, it is preferable to display the top view image. From these points of view, the predetermined value S can be set. In this case, switching section 24, in principle, the top view image is displayed if 5 Km through 15 Km/h>(or ≧) S and the bird's eye view image is displayed if 5 Km through 15 Km≦(or <) S. To achieve this, switching section 24 performs switching. In this determination, equal to or larger (≧), larger than (>), less than (<), and equal to or less than (≦) are within a range of a design matter. It is of course that the bird's eye view image may be displayed when 5 Km through 15 km>(or ≧S) in accordance with the driver's command and the top view image may be displayed when 5 Km through 15 Km≦(or <) S. The predetermined value of S in this embodiment is set to 10 Km. Then, in principle, in a case where 10 Km>S, the top view image is displayed. In a case where 10 Km≦S, the bird's eye view image is displayed. In this embodiment, the relationship between the predetermined value S and actual running speed is determined by switching section 24. Running information receiving section 26 compares the detected running velocity with predetermined value S, a signal indicating the result of the comparison may be supplied to switching section 24 as the running information.

In this way, switching section 24 carries out the switching of the display image in accordance with the running situation detected by the running situation detecting section 6 of the vehicle. Hence, the switching of the image in a direct correspondence with the driver's manipulation of the vehicle and the running situation of the vehicle can be achieved.

Switching section 24 includes: an image switching function 241 which switches the display of the top view image and the display of the bird's eye view image; and a viewing point switching function 242 which switches the viewing point of the image and the looking down angle from the viewing point. In this embodiment, image switching function 241 is activated. It is noted that viewing point switching function 242 will be described later in the second preferred embodiment. According to image switching function 241 switches the top view image display when viewing the vehicle substantially vertically from a preset viewing point and the display of the bird's eye view image looking down to the vehicle through the predetermined looking down angle and with a preset viewing point. Since each of the top view image generated, the viewing point of the bird's eye view image, and the looking down angle thereof is preset, transforming section 22 may transform the top view image by reading coordinate transformation equations 32 from storing section 30 in accordance with the viewing point and looking down angle. A time it takes to process the generation of the bird's eye view image is not so long and the display switching can be made at a high speed.

The determination of switching of the display image by means of switching section 24 is carried out on the basis of the running information retrieved (received) by running information receiving section 26. The running information is detected by means of on-vehicle running situation detecting section 6 which is deemed to be an external device. Running situation detecting section 6 includes: shift position sensor 61 which detects a manipulation and a manipulation history of the vehicle; and vehicular velocity sensor 62 which detects the velocity of the vehicle. Shift position sensor 61 detects whether the vehicle is forwarding, reversing, or is stopped according to the position of the shift lever of the transmission and detects the history of the vehicular forwarding direction according to the history of the shift lever (stops after the vehicle is forwarding and stops after the vehicle is reversed). In other words, the shift position signal according to the present invention includes the information related to the manipulation of the shift position and its operation (manipulation) history. The running direction of the vehicle and history of the running direction of the vehicle can be retrieved (received) from shift position sensor signal. Vehicle velocity sensor 62 detects the running velocity of the vehicle from a speedometer equipped within the vehicle. It is possible to supply the running velocity received from running information retrieving section 26 directly to switching section 24. However, upon determination of a magnitude relationship between the running velocity of the vehicle and predetermined value S and the result of determination may be supplied to switching section 24, as described above.

Running information receiving section 26 receives the vehicular running information from shift position sensor 61 or vehicle velocity sensor 62 and supplies this information to switching section 24. In this embodiment, although running information receiving section 6 is installed in addition to switching section 24, it is possible to have switching section 24 also serve as the function of running information receiving section 6.

Switching section 24 can be switched between the display of the top view image and that of the bird's eye view image on the basis of the vehicle driver issued command received in addition to the running information. Command reception section 25 accepts the driver issued command. This command is inputted via manual switch 5. The form of the vehicle driver issued command is not specifically limited to this. Such specifying an operation form command as "display the top view image when the vehicle runs in the forward direction" or as "display the bird's eye view image when the vehicle runs in the backward direction". It is preferable to set a higher priority in the switching process based on the accepted command by command reception section 25 than the switching process based on the running situation. In this embodiment, both of the running information retrieving section 26 and the command accepting section 25 are provided. In the usual practice, the switching process based on the running information is carried out. If the command issued from the driver via manual switch 5 is accepted, the switching process based on the vehicle driver issued command is carried out. Superposing section 23 superposes graphic data 33 on the accepted bird's eye view image (three-dimensional graphic data of the vehicle including the graphic data of the arrow mark representing the direction toward which the vehicle moves and the grid line). Storing section 30 previously stores vehicular graphic data p. p' on the basis of which an appearance of a vehicle is projected from a predetermined viewing point, arrow mark graphic data k and k' indicating the direction toward which the vehicle moves, and grid line g, g' indicating a reference line net of the displayed image as graphical data 33 therein. When the superposition process is carried out, superposing section 23 reads predetermined graphic data 33 from storing section 30. When the superposition processing is carried out, predetermined graphic data 33 is read from storing section 30 and is superposed on a display image (top view image or bird's eye view image). By superposing graphic data 33, the image of the vehicle and its surrounding are displayed stereographically. The driver can easily grasp the situation surrounding the vehicle. Especially, vehicular graphic data p, p' are image data representing the vehicle stereographically in accordance with a predetermined viewing point or a combination of the predetermined viewing point with the predetermined projection plane.

Vehicular graphic data p, p' stored for each combination of this viewing point and the projection plane are superposed with viewing point and/or the projection plane as a reference. A dead angle of each camera 1 results in a fragment of the photograph data and the fragment of the image of either the top view image or bird's eye view generated on the basis of this photographed data. The superposed vehicular graphic data p, p' compensate for this fragment. In other words, a shadow is involved in vehicular graphic data p, p' viewed toward the vehicle from the predetermined viewing point. If a part of the image at which the image is fragmented due to the presence of the dead angle of each camera 1 is hidden by shadows of the vehicular graphical data p, p', no problem of the fragment of the image occurs in the displayed image. As described above, the superposed vehicular graphic data p, p' can compensate for the fragment of the image which would appear on the image of the superposed vehicular graphical data p. p'. Thus, no fragment image can be generated.

In addition, vehicular graphic data p' and bird's eye view image constituting the display image has no distortion in the image if they are superposed since these are images projected from the same viewing point into the same projection plane. Furthermore, since the whole vehicle is expressed three-dimensionally according to vehicular graphic data p, p', the user is easy to grasp the vehicle situation with a stereographic sense of distance and is easy to confirm a part of the vehicle which is near to the ground which is easy to become the dead angle of each camera 1 can more accurately be displayed.

It is noted that, in this embodiment, as described above, synthesizing section 21, transforming section 22, and superposing section 23 installed in image generating section 2 execute such processes as the generation of top view image, the transformation into the bird's eye view image, and the superposition of the graphic data. However, an order of processes is not limited to this. For example, display image generating section 2 can integrally process the synthesis process of synthesizing section 21 and transforming process of transforming section 22. In addition, display image generating section 2 may integrally process the synthesis process of synthesizing section 21, superposition process of superposing section 23, and/or transformation process of superposing section 23. It is of course that it is possible to carry out the synthesis process, the transformation process, and the superposition process integrally.

An operation of the image display apparatus in the first embodiment according to the present invention will be described with chief references of flowcharts of FIGS. 4 and 5 and display examples of FIGS. 6 through 11.

Figure 4:
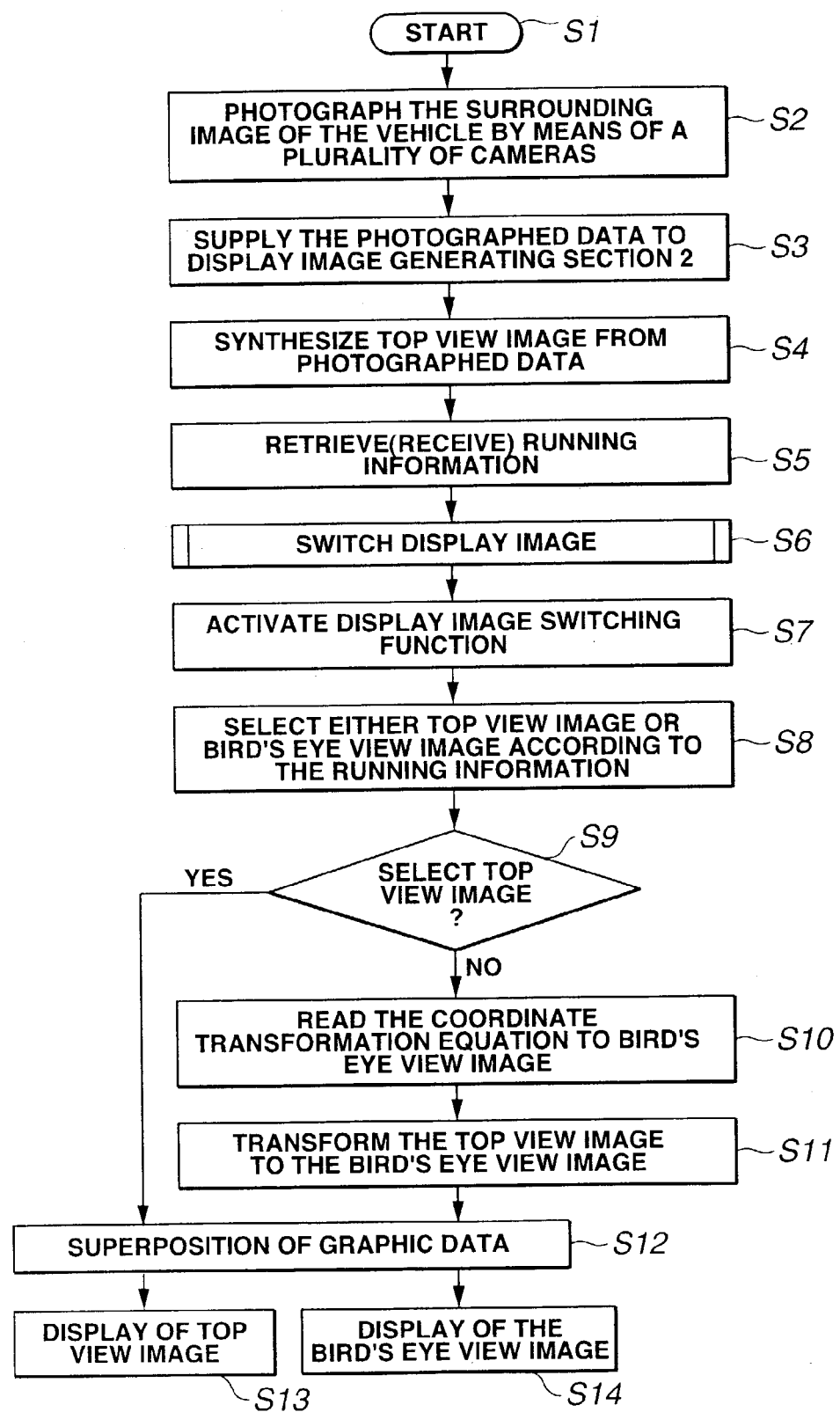
FIG. 4 is a general operational flowchart for explaining an operation of the image display apparatus in the first embodiment according to the present invention.
Figure 6:
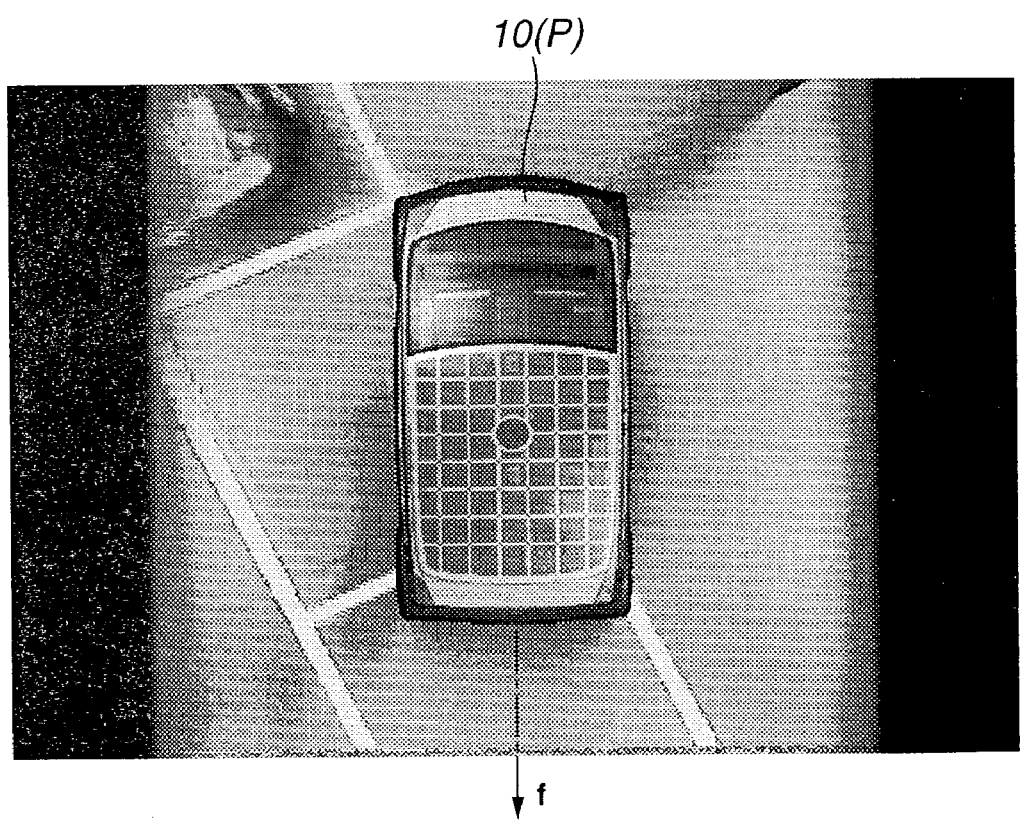
FIG. 6 is a display-example of a top view image selected at a step S631A shown in FIG. 5.
Figure 7:
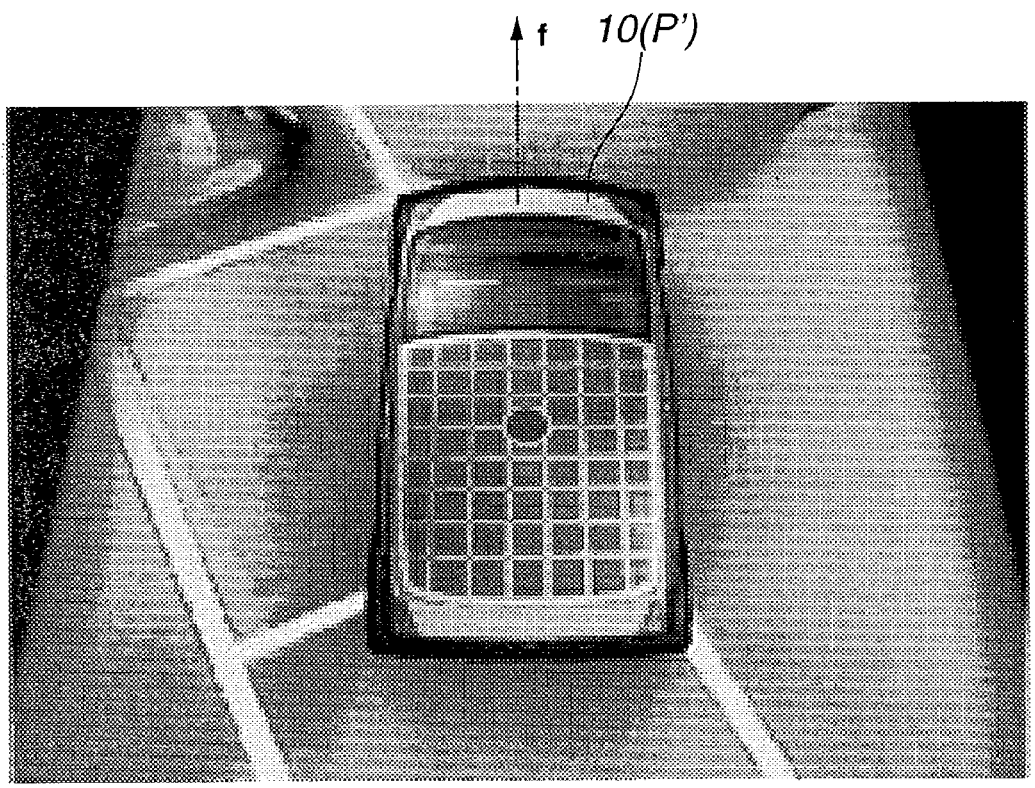
FIG. 7 is a display example of a bird's eye view image selected at a step S632B shown in FIG. 5.
Figure 8:
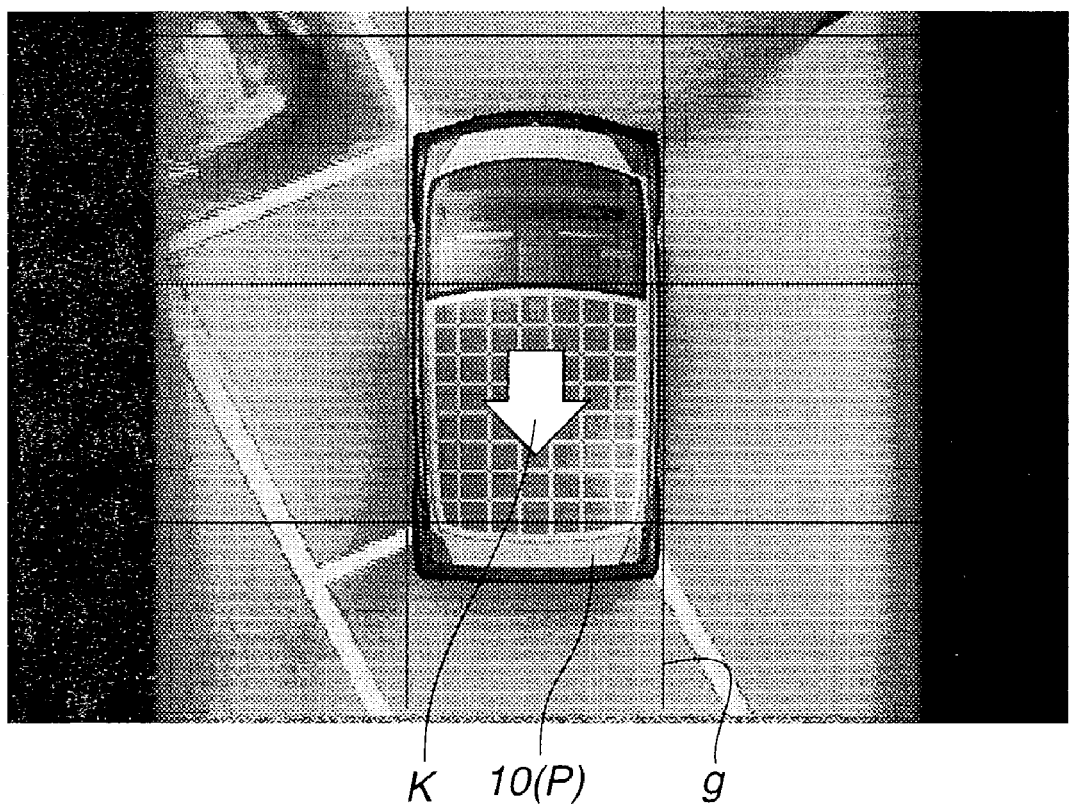
FIG. 8 is a display example of a superposition of an arrow mark graphic data indicating a direction toward which the vehicle moves on the top view image shown in FIG. 6.
Figure 9:
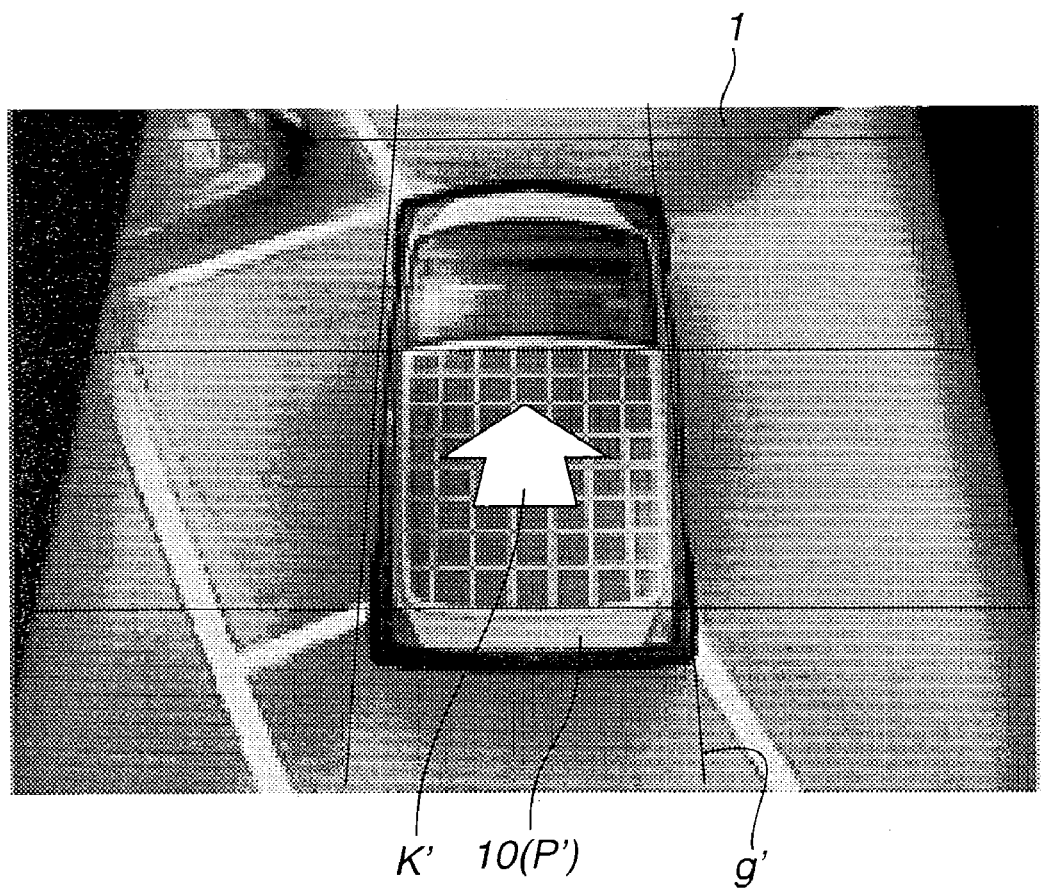
FIG. 9 is a display example of a superposition of the arrow mark graphic data indicating the direction toward which the vehicle moves on the bird's eye view image shown in FIG. 7.
Figure 10:
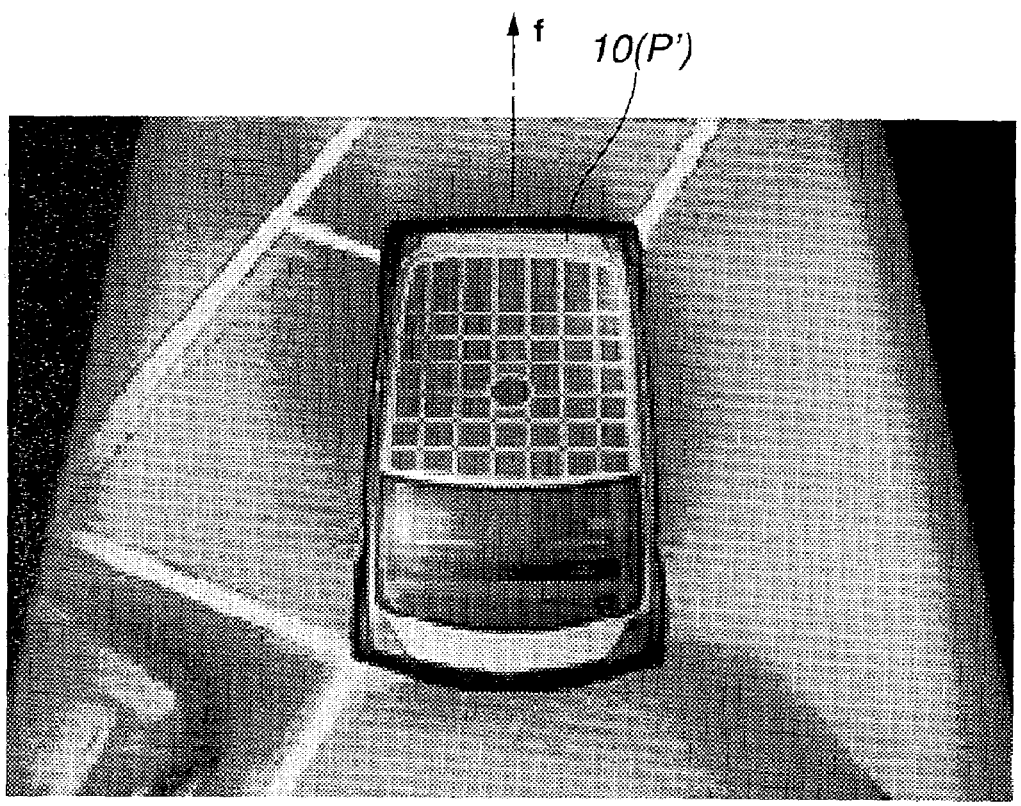
FIG. 10 is a display example of the bird's eye view image selected at a step S671B of FIG. 5.
Figure 11:
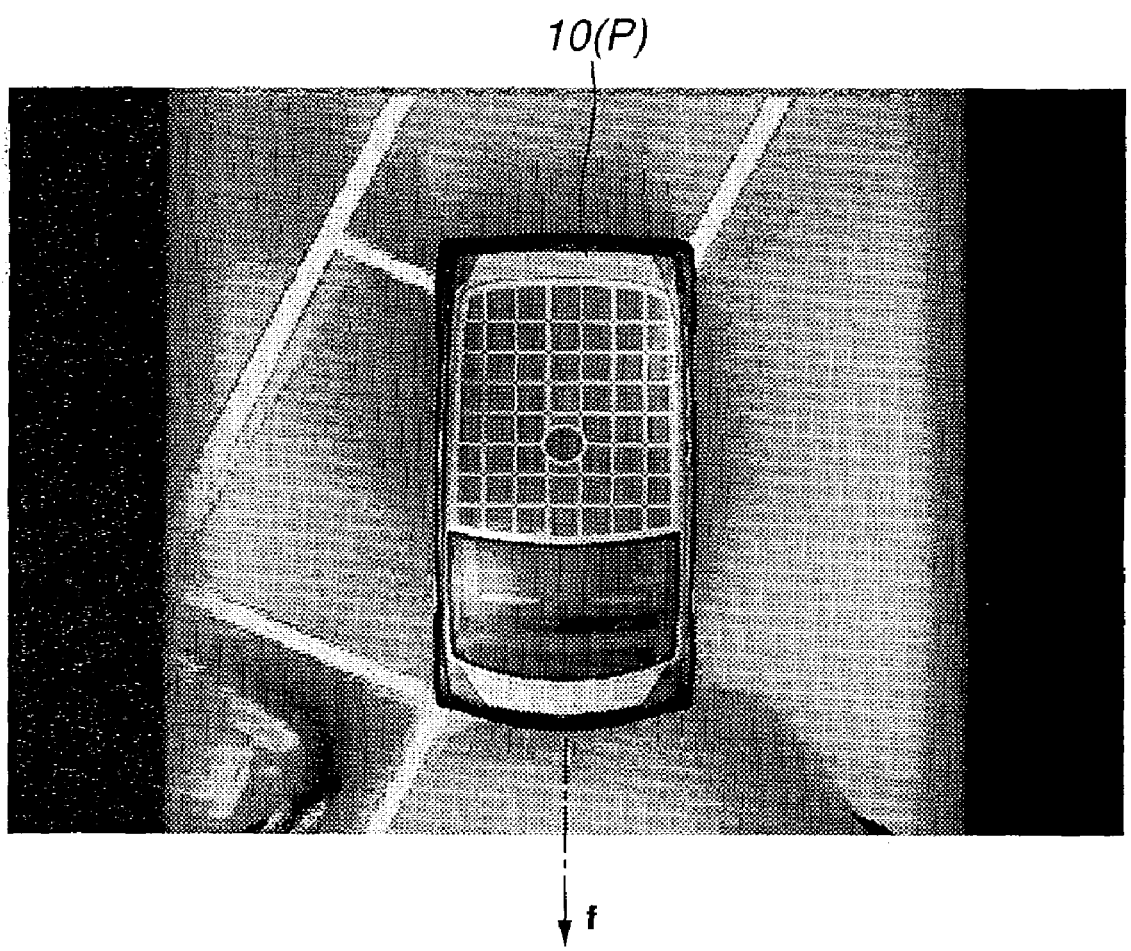
FIG. 11 is a display example of the top view image selected at a step S672A shown in FIG. 5.

FIG. 4 shows an operational flowchart for explaining an operation of image display apparatus 100 in the first preferred embodiment. FIG. 5 shows a detailed flowchart for explaining a switching operation of an image to be displayed. FIG. 6 shows a display example of a top view image selected at a step S631A in FIG. 5. FIG. 7 shows a display example of a bird's eye view image selected at a step S632B shown in FIG. 5. FIG. 8 shows a display example of arrow mark graphic data k representing the direction toward which the vehicle moves and which is superposed (or superimposed) on the top view image shown in FIG. 6. FIG. 9 shows a display example of an arrow mark graphic data k' representing the direction toward which the vehicle moves and which is superposed on the bird's eye view image shown in FIG. 7. FIG. 10 shows a display example of the bird's eye view image selected at a step S671B of FIG. 5. FIG. 11 shows a display example of the top view image selected at a step S672A shown in FIG. 5.

As shown in FIG. 4, if vehicular image display apparatus 100 is activated at a step S1, the plurality of cameras 1 (1a, 1b, - - - ) photograph the respective images of vehicle and vehicular surrounding at a step S2. At a step S3, cameras 1 supply the photographed data to image generating section 2. At a step S4 of FIG. 4, synthesizing section 21 synthesizes the top view image surrounding the vehicle on the basis of the photographed data and camera information 31 read from storing section 30. At a step S5 of FIG. 4, running information receiving section 26 receives the running information from the running situation detecting section 6 before or after the synthesis process by the synthesizing section 21. The received running information is supplied to switching section 24. Switching section 24 switches the image displayed on display 4 into either the top view image or bird's eye view image in accordance with the running information at a step S6 of FIG. 4. At the time of switching the displayed image, image switching function 241 or view point switching function 242 is activated. In this embodiment, image switching function 241 activated to switch the display by selecting either of the top view image or the bird's eye view image at a step S7 of FIG. 4. Image switching function 241 selects either the top view image or the second view image at a step S8 of FIG. 4 in accordance with the vehicular running information. This selection and switching operations will be described later with reference to FIG. 5.

If image switching function 241 of switching section 24 selects the top view image (step S9), it is not necessary to carry out the transformation process from the top view image to the bird's image and image switching function 241 does not command the transformation process from the top view image to transformation section 22. In this case, the top view image synthesized by synthesizing section 21 is directly supplied to superposing section 23. Thus, graphical data are superposed on synthesizing section 21 at a step S12 in FIG. 4. The top view image on which the graphical data are superposed is displayed through display 4. On the other hand, if image switching function 241 of switching section 24 selects the bird's eye view image in place of the top view image at a step S9, transformation section 22 reads coordinate transformation equation 33 of the bird's eye view image from the storing section 30 at a step S10 of FIG. 4. Transforming section 22 refers to the coordinate transformation equations 32 read from storing section 30 and transforms the top view image into the bird's eye view image at a step S11 of FIG. 4. The transformed bird's eye view image is supplied to superposing section 23. Then, the graphic data are superposed on bird's eye view-image at step S12. The bird's eye view image onto which the graphical data is superposed is displayed through display 4 at step S14.

Next, a switching operation of the displayed image will be described below with reference to FIG. 5.

Figure 5:
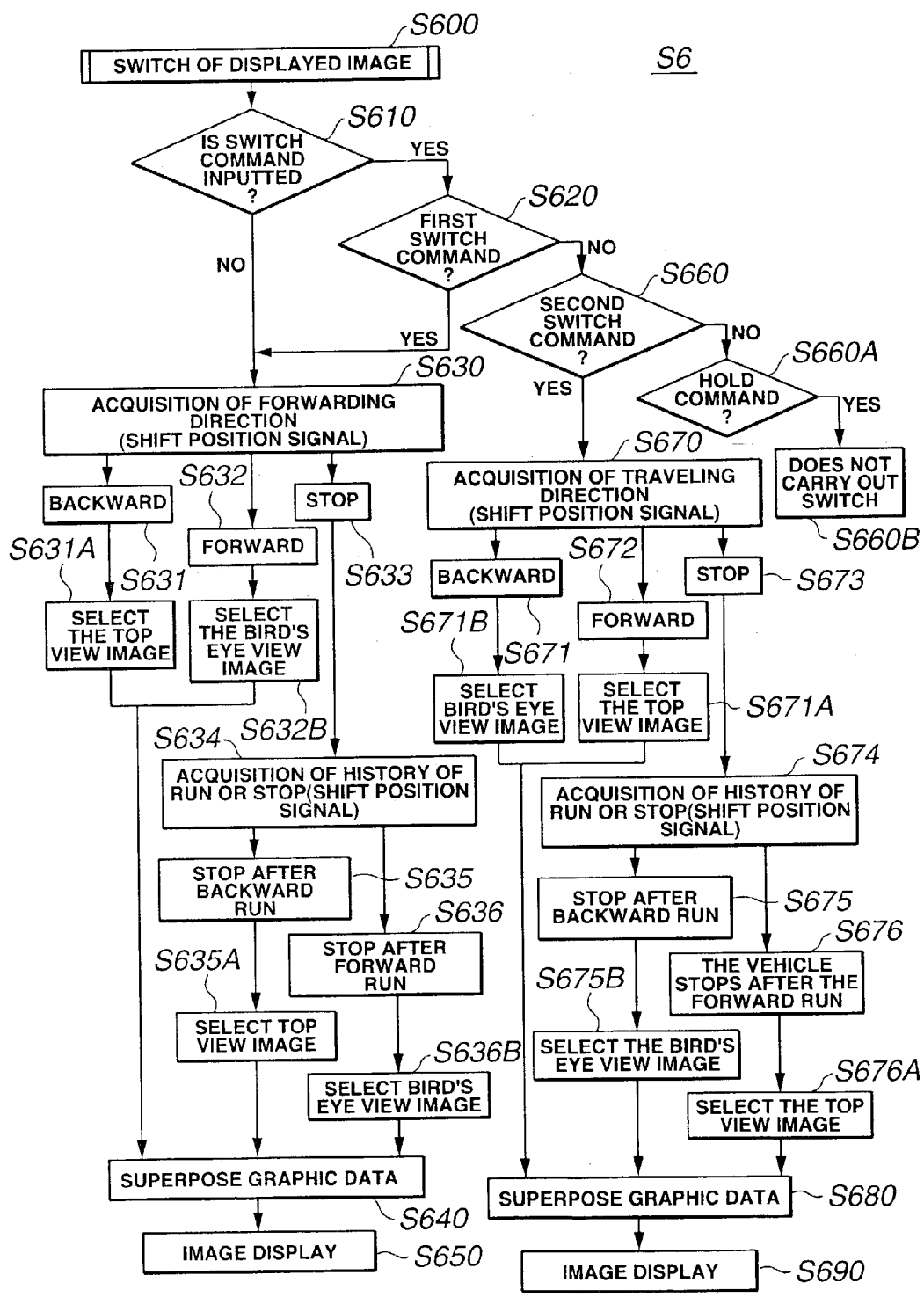
FIG. 5 is an operational flowchart for explaining an operation of switching a display image on a display of the image display apparatus in the first preferred embodiment according to the present invention.

The operation with reference to FIG. 5 corresponds to a subroutine to switch the image displayed at step S6 described in FIG. 4. Switching section 24 in this embodiment switches the image displayed on the basis of the running information received by running information receiving section 26 and switches the image to be displayed on the basis of the switching command from the vehicle driver which is accepted by command information (acceptance) section 25. Then, if switching section 24 is activated to switch the image to be displayed at a step S600, command reception (acceptance) section 25 determines whether the switch command is inputted by the vehicle driver via manual switch 5 (step S610). If no switch command from the driver is issued, the routine goes to a step S630. At step S630, switching section 24 retrieves the shift position signal from shift position sensor 61 of the running information retrieving section 26 via running information retrieving section 26.

In this embodiment, image switching function 241 of switching section 24 determines whether either the top view image or the bird's eye view image should be displayed and switches the display contents.

If, at a step S631, switching section 24 receives the information to an effect that the vehicle goes backward from the retrieved shift position signal from the retrieved shift position signal. In this case, switching section 24 selects the top view image at a step S631A. At a step S640, superposing section 23 superposes a vehicular graphic data p by means of superposing section 23 if necessary. At a step S650, the top view image after the superposition process is displayed on display 4. The top view image processed at step S650 is shown in FIG. 6. In FIG. 6, f denotes the forwarding direction of the vehicle. In this case, the direction toward which the vehicle moves is a backward (rearward) direction. In addition, superposing section 23 may superpose arrow mark graphic data k representing the direction toward which the vehicle moves before the stop to clearly indicate the direction toward which the vehicle moves before the stop or may superpose a grid line g which provides the image reference line net. An example of the top view image on which the arrow mark graphic data k representing the direction that the vehicle moves and grid line g are superposed is shown in FIG. 8.

As described above, the top view image is displayed during the backward motion of the vehicle when the vehicle is parked in a parking lot or in a garage. Hence, the driver can easily grasp the positional relationship between a difference in the display form of the top view image and the bird's eye view image. Secondly, in a case where the vehicular running information to the effect that the vehicle is running in the forward direction is received from the retrieved shift position signal at a step S632, switching section 24 selects the bird's eye view image at a step S632B. If necessary, at a step S640, superposing section 23 carries out the superposition of the vehicular graphic data p'. Then, the bird's eye view image is displayed after the superposition process on display 4 at a step S650. The bird's eye view image is shown in FIG. 7.

In FIG. 7, f denotes the direction (backward movement) that vehicle 10 is moved. Furthermore, arrow mark graphic data k' representing the direction toward which vehicle 10 moves before stop may be superposed in order to clearly indicate the movement direction before the stop. FIG. 9 shows a display example of the bird's eye view image superposing arrow mark graphic data k' and a grid line g' (for the bird's eye view purpose) which is the reference line net of the display image. As described above, during the forward run in which there are many cases where the vehicle is driving while avoiding a collision of obstacles, the bird's eye view image is displayed so that the driver easily grasps the sense of distance stereographically from the bird's eye view image to the vehicle (vehicle 10 in which the image display apparatus in this embodiment is mounted). Furthermore, vehicular graphic data p', arrow mark graphic data k', and gridline g' are superposed. Thus, the bird's eye view image such that a stereographic sense of distance of the obstacle surrounding the vehicle and the vehicle surrounding are easily grasped can be displayed to the vehicle driver through display 4.

If the running information to an effect that the vehicle is stopped is received from the shift position signal at a step S633, switching section 24 further receives the running information related to the history of the vehicle run or stop at a step S634. The running information related to the history of the run or stop is received from the shift position signal related to the history of the vehicular run or stop. If the running information to an effect that the vehicle runs in the reverse direction and, thereafter, has stopped at a step S635, switching section 24 selects the top view image at step S635A. If needed, the superposition of vehicular graphic data p and arrow mark graphic data k representing the movement direction of the vehicle are superposed. The superposed top view image is displayed on display 4. The top view image displayed is the same as FIGS. 6 and 8.

On the other hand, if the running information to an effect that the vehicle has stopped after the vehicle runs in the forwarded (advanced) direction at a step S636 of FIG. 5, switching section 24 selects the bird's eye view image at a step S636B. If necessary, the superposition of graphic data p and arrow mark graphic data k representing the movement direction of the vehicle are carried out. Display 4 serves to display the top view image on which the superposition process has been carried out. The bird's eye view image displayed is the same as FIG. 7 and FIG. 9.

In this way, the bird's eye view image is displayed in a case where the vehicle is stopped after the vehicle runs in the forward direction and the top view image is displayed in a case where the vehicle is stopped after the vehicle runs in the backward direction. Thus, in a case where the vehicle frequently stops and runs in the forward direction or runs in the backward direction, whenever the vehicle stops, runs in the forward direction, and runs in the backward direction, a frequent switching between the top view image and the bird's eye view image can be prevented.

Referring back to step S610 of FIG. 5, an operation when the switch command is inputted to image display apparatus 100 will be described below. Switching section 24 in the preferred embodiment performs the switching of the display image in which a switch command by the driver is set to have a higher priority in a case where the switch command is inputted via manual switch 5. The modes of the switch commands are not specifically limited. However, the switch command in this embodiment has three forms.

That is to say, the first switch command is a command to display the top view image when the vehicle runs in the backward direction, display the bird's eye view image when the vehicle runs in the backward direction, display the bird's eye view image when the vehicle runs in the forward direction, display either the top view image or bird's eye view image depending upon the direction toward which the vehicle moves before the vehicle has stopped, viz., display the top view image when the vehicle has stopped after the vehicle runs in the backward direction and display the bird's eye view image when the vehicle has stopped after the vehicle runs in the forward direction. When the vehicle runs in the backward direction, there are many cases of such a situation that the driver moves the vehicle to park or to enter a garage. In such a case as described above, the top view image may be considered to make it easy to grasp a defined parking area and a relationship between the garage and the vehicle. Hence, in a case where the driver inputs the first switch command via manual switch at a step S620, the same operations as steps S630 and S650 are carried out. In addition, the second switch command is a command to display the bird's eye view image when the vehicle runs in the forward direction, display the top view image when the vehicle runs in the backward direction, display either the top view image or the bird's eye view image depending upon the direction that the vehicle moves before the vehicle has stopped when the vehicle has stopped, viz., display the bird's eye view when the vehicle has stopped after the vehicle runs in the backward direction and display the top view image when the vehicle has stopped after the vehicle runs in the backward direction and display the top view image when the vehicle has stopped after the vehicle runs in the forward direction. This second switch command prescribes a reverse image switching to the first switch command. Switching section 24 which has obtained the second switching command receives the shift position signal from shift position sensor 61 of running situation detecting section 6 via running information receiving section 26. If the running information to the effect that the vehicle runs in the backward direction at a step S671, switching section 24 selects the bird's eye view image at a step S671B. If necessary, superposing section 23 superposes the graphic data on the bird's eye view image at a step S680. The bird's eye view image after the superposition process is displayed on display 4 at a step S690 of FIG. 5. The bird's eye view image display example is shown in FIG. 10. In FIG. 10, f denotes the direction toward which vehicle 10 runs (in this case, the vehicle runs in the backward direction). As shown in FIG. 10, the bird's eye view image is displayed during the backward run of vehicle 10 so that the stereographic sense of distance between the vehicle and the obstacle can easily be grasped from the bird's eye view image. In a case where the vehicle receives the running information to the effect that the vehicle is running in the forward direction from the obtained shift position signal at a step S672, switching section 24 selects the top view image at a step S672A. If necessary, superposing section 23 carries out the superposition of the vehicular graphic data p by means of superposing section 23. The superposed top view image is displayed on display 4 at a step S690. FIG. 11 shows a display example of the top view image in this case. In FIG. 11, f denotes the direction toward which vehicle 10 moves (in this case, in the forward direction). In this way, the top view image is displayed during the forward run of the vehicle so that, in a case where the vehicle runs in the forward direction to park the vehicle in a predetermined area or to go into the garage, the positional relationship between the predetermined parking area or garage and the vehicle can easily be grasped. Furthermore, in a case where the running information to the effect that the vehicle is stopped from the obtained shift position signal (at a step S673), switching section 24 receives the running information related to the history of the vehicular run or stop at a step S674. The running information related to the history of the vehicular run or stop is obtained from the shift position signal related to the operation history of the shift position signal related to the operation history of the shift position. In a case where the running information to the effect that the vehicle runs in the backward direction and, thereafter, is stopped is received at a step S673, switching section 24 receives the running information related to the history of the vehicular run or stop at a step S674 of FIG. 5. If the running information related to the vehicular run or stop is received from the shift position signal related to the operation history of the shift position (step S675 in FIG. 5), switching section 24 selects the bird's eye view at a step S675B. If necessary, the superposition of the graphic data by means of superposing section 23 is carried out. Display 4 displays the superposed bird's eye view image. The displayed bird's eye view image is the same as FIG. 10.

On the other hand, if the running information to the effect that the vehicle stops after the vehicle runs in the forward direction at a step S676, switching section 24 selects the top view image (at a step S676A). If necessary, the superposition of the graphic data by means of superposing section 23. Display 4 displays the superposition processed top view image. The top view image displayed is the same as FIG. 11. In this way, in a case where the vehicle stops after the vehicle runs in the backward direction, the bird's eye view image is displayed. In a case where the vehicle runs in the forward or backward direction and stops and the vehicular run and stop are frequently repeated, a frequent switching between the bird's eye view image and top view image can be prevented. The display is switched in accordance with the second switch command. Hence, even under a situation different from that normally predicted, the display image in accordance with the running situation can be displayed.

Next, if a hold command as a third switch command is inputted at a step S660A, either the top view image or the bird's eye view image is displayed irrespective of the running situation (at a step S660B). The hold command is a command to display the top view image, display the bird's eye view image, and continue to display either the top view image or the bird's eye view image now presently displayed. Switching section 24 switches the display of the top view image or the display of the bird's eye view image in accordance with the hold command. The hold command can display the image that the driver is desired to view even under a situation other than that presumed in the first or second switch command.

The switching operation of image display apparatus between the display of the top view image and that of the bird's eye view image in accordance with the running information related to the history of the vehicular run or stop has been described. In this embodiment, the display of the top view image and that of the bird's eye view image can also be carried out in accordance with the running information related to the running speed (vehicular velocity) of vehicle 10. The running information related to the running speed (vehicular velocity) is derived from vehicle velocity sensor 62 of running situation detecting section 6. Switching section 24 receives the running information related to the vehicular velocity via running information receiving section 26.

Figure 12:
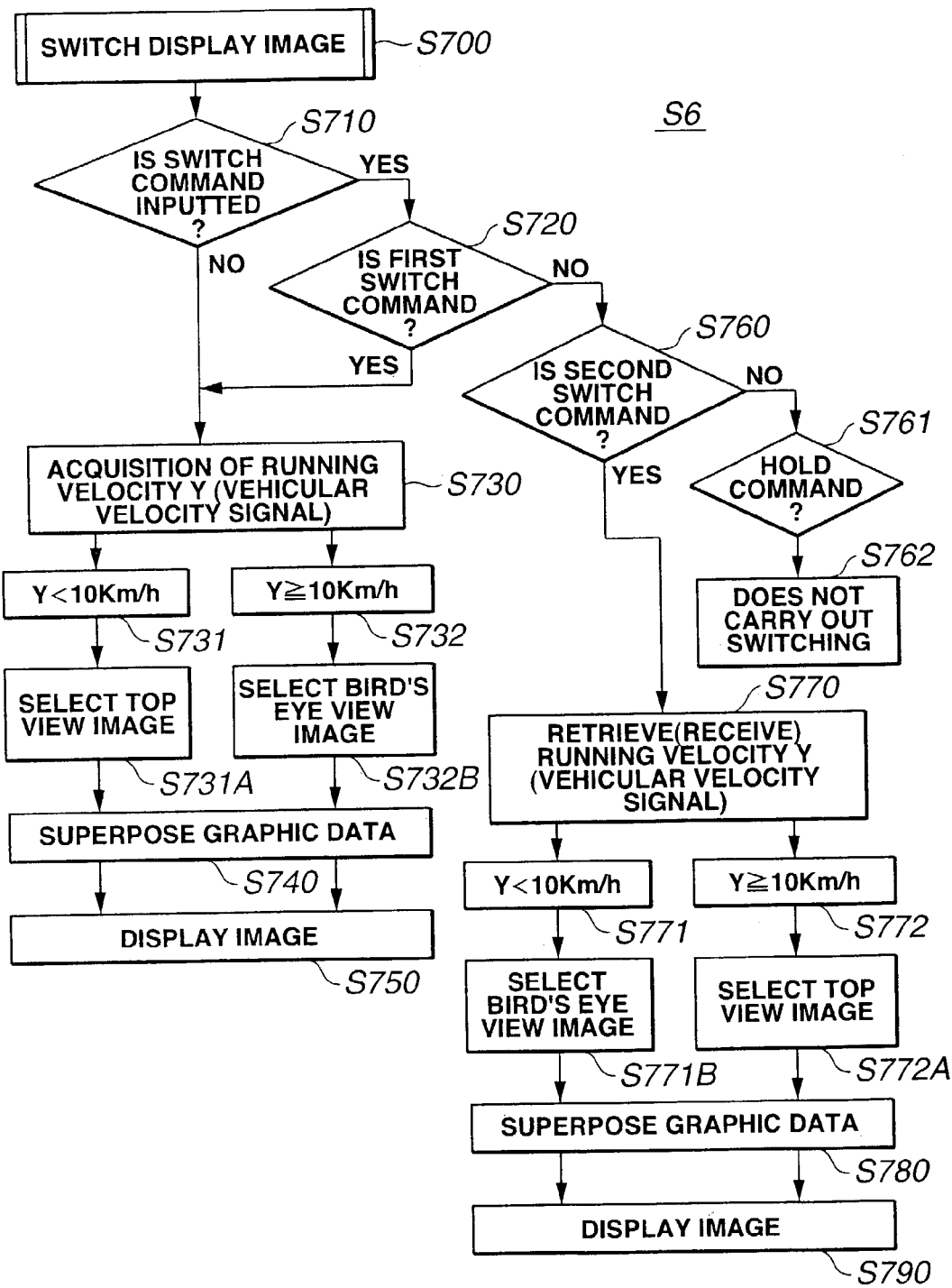
FIG. 12 is an operational flowchart for explaining another operation of switching the display image on the display as an alternative to the first embodiment.

An operation related to the switching of the display of the image in accordance with the running information related to the vehicular velocity will be described with reference to an operational flowchart of FIG. 12. FIG. 12 shows a subroutine of the switch of the display at step S6 shown in FIG. 4. It is noted that a basic operation is common to the operation explained with reference to FIG. 5. Switching section 24, in the alternative, switches the display image on the basis of the running information received by running information receiving section 26 and switches the image to be displayed on the basis of the vehicle driver's switch command accepted by command reception section 25. That is to say, if switching section 24 is activated to perform the switching of the image to be displayed at a step S700 in FIG. 12, command reception (accepting) section 25 determines whether the switch command is inputted from the vehicle driver via manual switch 5 at a step S710 shown in FIG. 12. If the switch command from the driver is not inputted (No), the routine goes to a step S730.

At step S730, switching section 24 receives a vehicular velocity signal from vehicular velocity sensor 62 of running situation detecting section 6 via running information retrieving section 26. In this alternative, image switching function 241 of switching section 24 determines which of the top view image or the bird's eye view image should be displayed and switches the image display.

First, at a step S731, if the vehicular running information to the effect that running velocity Y of the vehicle is lower than 10 Km/h from the received running velocity signal, switching section 24 selects the top view image at a step S731A in FIG. 12. If needed, the superposition of vehicular graphic data p by means of superposing section 23 is carried out (a step S740 shown in FIG. 12). Then, the top view image after the superposition process is displayed on display 4 at a step S750 shown in FIG. 12. This top view image display example is shown in FIGS. 6 and 8. In this way, in a case where the running velocity is low in such a case where the vehicle goes into the predetermined parking area, the top view image is displayed under the situation under which the running velocity is low. The vehicle driver can easily grasp the positional relationship between the vehicle and parking area from the display of the top view image.

Secondly, in a case where the running velocity of the vehicle is equal to or higher than 10 Km/h from the received running velocity signal at a step S732, switching section 24 selects the bird's eye view image at a step S732B in FIG. 12. If necessary, the superposition of the vehicular graphic data p' by means of superposing section 23 is carried out at step S740. The bird's eye view image after the superposition process is ended is displayed on display 4 at step S750. The display examples of the bird's eye view images in this situation are shown in FIGS. 7 and 9. As described above, the bird's eye view image is displayed under such a situation that the vehicle is running at a speed which is not the low speed. The driver can, thus, recognize not only the vehicle surrounding but also a far away from the forward direction of the vehicle or rearward direction of the vehicle.

Referring back to step S610 of FIG. 4, an operation in a case where one of three switch commands is inputted will be described below. The switch commands have three forms in this alternative.

First, the first switch command is a command to display the top view image when the vehicle runs at a speed lower than 10 Km/h and to display the bird's eye view image when the vehicle runs at a speed equal to or higher than 10 Km/h. If the vehicle is running at the low speed, there are many cases where the vehicle is parked or the vehicle goes into the garage. The second switch command prescribes the image switching which is reverse to the first switch command. Even if the vehicle is running at a low speed, there is often the case where the bird's eye view image which is easy to grasp the stereographical sense of distance between the vehicle and the obstacle. Even in a case where a vehicular relative positional relationship is easier to be grasped even when the vehicle is running at a speed not at a low speed, there is often the case where the top view image which is easy to grasp a relative positional relationship of the vehicle.

In a case where the vehicle runs at a low speed, there are many cases where the vehicle driver parks the vehicle and moves the vehicle to enter into the garage. In this situation, viewing the top view image is considered to be easier to grasp the positional relationship between the defined parking area (or garage space) and the vehicle. In a case where the vehicle runs at a speed higher than the low speed, viewing the bird's eye view image which can look out over a wide range of the surrounding of the vehicle is easier to confirm the direction toward which the vehicle moves. An operation in response to the first switch command has the same contents as the basic operation. Hence, if the first switch command is inputted by the vehicle driver at step S720, the same series of operations from step S730 to step S750 are carried out.

Next, the second switch command is the command to display the bird's eye view image when the vehicle runs at a speed lower than 10 Km/h and to display the top view image when the vehicle runs at a speed equal to or higher than 10 Km/h. The second switch command prescribes the display image switching reverse to that in the case of the first switch command. This is because even if the vehicle runs at a low speed, there is often a case where the bird's eye view image is to be displayed which is easy to grasp the stereographic sense of distance between the vehicle and the obstacle and there is often the case even if the vehicle runs at a speed not at the low speed, the top view image which is easier to grasp the relative positional relationship is to be displayed.

Furthermore, command reception (accepting) section 25 receives the hold command as the third switch command signal. The hold command displays which of either the top view image or the bird's eye view image is displayed. If the first switch command is selectively inputted by the driver at step S720, the routine goes to step S730. The above-described operation is carried out in the same way as described before. If the second switch command is inputted (Yes at step S760), the routine goes to a step S770 shown in FIG. 12. Switching section 24 receiving the second switch command receiving the running velocity signal from vehicular velocity sensor 62 of running situation detecting section 6 via running information receiving section 26. The vehicular running information to the effect that the running speed Y of the vehicle is lower than 10 Km/h from the received running speed signal at a step S771 of FIG. 12, switching section 24 selects the bird's eye view image at a step S771B. If necessary, the superposition of the graphic data by means of superposing section 23 is carried out by superposing section 23 at a step S780. The bird's eye view image after the superposition process is displayed on display 4 (a step S790). On the other hand, if the running information to the effect that running speed Y of the vehicle is equal to or higher than 10 Km/h from the received running speed signal at a step S772, switching section 24 selects the top view image at a step S772A. If necessary, superposing section 23 superposes the top view image on the graphic data at a step S780. The top view image after the superposition process is displayed on display 4 at a step S790 of FIG. 12. The display image is switched in accordance with the second switch command. Thus, even under a situation different from that which would normally be predicted, the image can be displayed which accords with the running situation.

Next, if the hold command is inputted as the third switch command (a step S761), either the top view image or the bird's eye view image is displayed irrespective of the running situation. The hold command is the command to display the top view image, to display the bird's eye view image, or to continue to display either of the top view image or the bird's eye view image which is now currently displayed. Switching section 24 switches the display image of either the top view image or bird's eye view image in accordance with the hold command. This hold command can serve to display the image that the vehicle driver desires to view even under a situation other than that would presume in the first or second switch command. The hold command is described at steps S761 and S762 in FIG. 12.

The image display apparatus in the first embodiment has the following advantages. That is to say, the display image is switched between the top view image and the bird's eye view image in accordance with the running information related to the running situation so that an appropriate image in accordance with the driver's driving operation can be displayed and the drive operation by the vehicle driver can be assisted.

In details, in a case where the switch of the display image is carried out in accordance with the running situation related to the direction toward which the vehicle runs (moves), during the vehicular run in the backward direction, for example, in a case where the vehicle driver moves the vehicle to enter into the predetermined parking area or the garage while running the vehicle in the backward direction, the top view image approximately vertically looking down to the vehicle from the upper sky above the vehicle is displayed so that the vehicle driver can easily grasp the relationship between the vehicle and parking area. On the other hand, during the vehicular forwarding directional movement, for example, in a case where the vehicle runs in the forward direction while avoiding the collision against the obstacle located at the surrounding of the vehicle, the bird's eye view image is displayed looking down to the vehicle with the predetermined looking down angle from the upper sky above the vehicle. The driver can easily grasp the stereographic sense of distance of the obstacle located at the surrounding of the vehicle from the bird's eye view image.

In addition, in a case where the display switch of the display in accordance with the running information related to the running speed of the vehicle is carried out, the vehicle runs at the low speed (for example, lower than 10 Km/h). At this time, suppose that the vehicle driver moves the vehicle to enter into the predetermined parking area or the garage. In this case, the top view image approximately vertically looking down to the vehicle from the upper sky above the vehicle is displayed so that the vehicle driver can easily move the vehicle to enter into the predetermined parking area or the garage while confirming the relationship between the vehicle (vehicle body) and the parking area through the top view image. On the other hand, in a case where vehicle runs at a speed equal to or higher than the low speed (for example, 10 Km/h or higher), the bird's eye view described above is, in turn, displayed so that the driver can drive the vehicle while confirming the wide range of the forwarding direction including the vehicle and the surrounding of the vehicle through the bird's eye view image. Furthermore, when the switch command is inputted by the vehicle driver, the display of the image is switched in accordance with the accepted switch command. Thus, even under such a situation that the vehicle driver moves the vehicle to enter into the parking area or garage and moves the vehicle to run in the backward direction by a long distance, an appropriate image can be displayed for a driving assistance of the vehicle driver.

Vehicular graphical data p or p' are superposed on either the top view image or bird's eye view image so that a portion of the photographed data which cannot be obtained as the photograph image due to the dead angle for cameras 1 can be compensated by stereographic vehicular graphic data p or p'. Furthermore, since the stereographic vehicular graphic data p or p' representing the vehicle stereographically is superposed, an actual vehicular shape including the stereographic sense of distance in the display image can be expressed. That is to say, the sense of distance in a direction of height of the vehicle can be expressed. Images of a surrounding of tire wheels of the vehicle, of the surrounding of rear bumpers, of the surrounding of front bumpers, and of the surrounding of sill outers which are easy to be the dead angles for cameras 1 can also be compensated by the vehicular graphic data p or p'.

In addition, since arrow mark graphic data k or k' indicating the direction toward which the vehicle moves is superposed on the top view image or the bird's eye view image, the direction that the vehicle is moving can easily be recognized from the image displayed. Since grid line g or g' indicating the reference line net of the image is superposed on the top view image or the bird's eye view image, the difference in the display form between the top view image and the bird's eye view image can easily be recognized.

Second Embodiment

The image display apparatus in a second preferred embodiment according to the present invention will be described below. In the second embodiment, only a technique of switching the display image in switching section 24 is different from the first embodiment and the fundamental operation is generally the same as described in the first embodiment. Herein, a duplicate explanation from the first embodiment is avoided and only a difference point from the first embodiment will be described below.

When image switching function 241 of switching section 24 is activated in the first embodiment, image switching section 241 determines the form of the display image displayed in accordance with the running situation of the vehicle, the transforming process of transforming section 22 is controlled to switch the display image. On the other hand, in the second embodiment, viewing point switching function 242 of switching section 24 shown in FIG. 1 is activated. Viewing point switching function 242 makes previously the position of the viewing point accord with the vehicular running situation corresponding to the looking down angle in accordance with the running information. This correspondent relationship may make the running information correspondent to the position of the viewing point and/or looking down angle. This corresponding relationship may make the running information, the position of the viewing point, and/or looking down angle correspond to each other according to a table on which the running information, the position of the viewing point, and looking down angle are arranged. Or alternatively, these correspondence relationship may be in accordance with an equation to derive the position of the viewing point and/or looking down angle from the running information. Viewing point switching function 242 refers to the corresponding running information, the position of the viewing point, and looking down angle to set the viewing point of the display image transformed by transforming section 22 and the looking down angle. The viewing point and looking down angle of the display image transformed by transforming section 22 are set by viewing point switching function 242. The position of the viewing point and looking down angle in accordance with the running information are calculated. When these parameters are set, the switch command is supplied to transformation section 22 together with signals indicating the position of the viewing point and the looking down angle. Transforming section 22 transforms the top view image synthesized by means of the synthesizing section 21 in accordance with a transformation command into an image looking down to the vehicle from the predetermined viewing point through the predetermined looking down angle.

Figure 13:
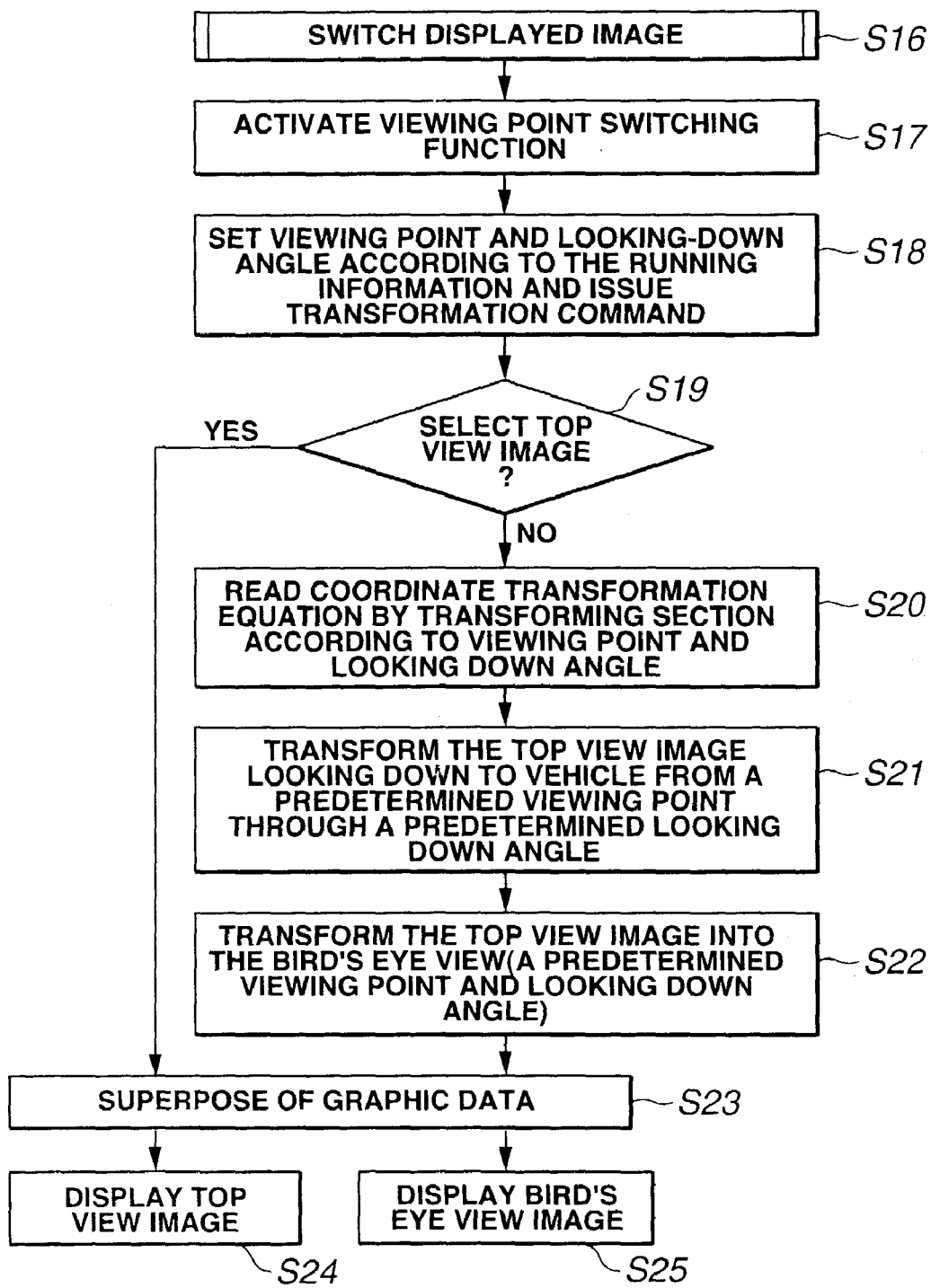
FIG. 13 is an operational flowchart for explaining a viewing point switching function of a switching section in a case of the image display apparatus in a second preferred embodiment according to the present invention.

FIG. 13 shows an operational flowchart for explaining viewing point switching function 242 of switching section 24 in the second embodiment of the image display apparatus according to the present invention. This operation shown in FIG. 13 is a subroutine of step S6 shown in FIG. 4 at which the switching of the display image is carried out.

At a step S16 in FIG. 13, the routine of FIG. 4 enters this subroutine. At a step S17, viewing point switching function 242 is activated. Viewing point switching function 242 switches and sets the position of the viewing point and looking down angle in accordance with the running information. A transformation command including the information on the position of the switched (or set) viewing point and looking down angle thereof is supplied from viewing point switching function 242 to transforming section 22 at a step S18 of FIG. 13. If the position of the viewing point of the displayed image and looking down angle thereof are the same as the position of the viewing point of the top view image and the looking down angle synthesized by synthesizing section 21 (Yes at a step S19), the top view image is directly supplied to superposing section 23 to carry out the superposition process of the graphic data at a step S23 in FIG. 13 and the top view image is finally displayed through display 4 at a step S24 in FIG. 13. On the other hand, if the display image is an image different from the top view image before the transformation, namely, if the position of the viewing point of the displayed image and the looking down angle thereof are different from those of the top view image (No at step S19), transforming section 22 reads the coordinate transformation equation 33 in accordance with the position of the viewing point and the looking down angle included in the switch command from storing section 30 at a step S20 and transforms the top view image synthesized by means of synthesizing section 21 into the bird's eye view image which is an image looking down to the vehicle from the viewing point set on the basis of the transformation equation 33 read through the set looking down angle at a step S22. The graphic data is superposed on the bird's eye view image to be displayed on display 4 at steps S23 and S25.

As described above, the image display apparatus in the second embodiment has the following advantage in addition to the advantages that the first embodiment has. That is to say, since the position of the viewing point of the display image and looking down angle thereof can arbitrarily be switched in accordance with the running information indicating the running situation of the vehicle, an optimum image can be displayed when assisting the drive of the vehicle by the vehicle driver during the various running situations.

In each of the first and second embodiments, the image display apparatus for the automotive vehicle has been described. However, each of the first and second embodiment is applicable to a case wherein a vehicular image display method is applied or the computer which is operated in accordance with an image display program of the vehicle. The same advantages as described above can also be achieved in the above-described case.

Third Embodiment

Figure 14:
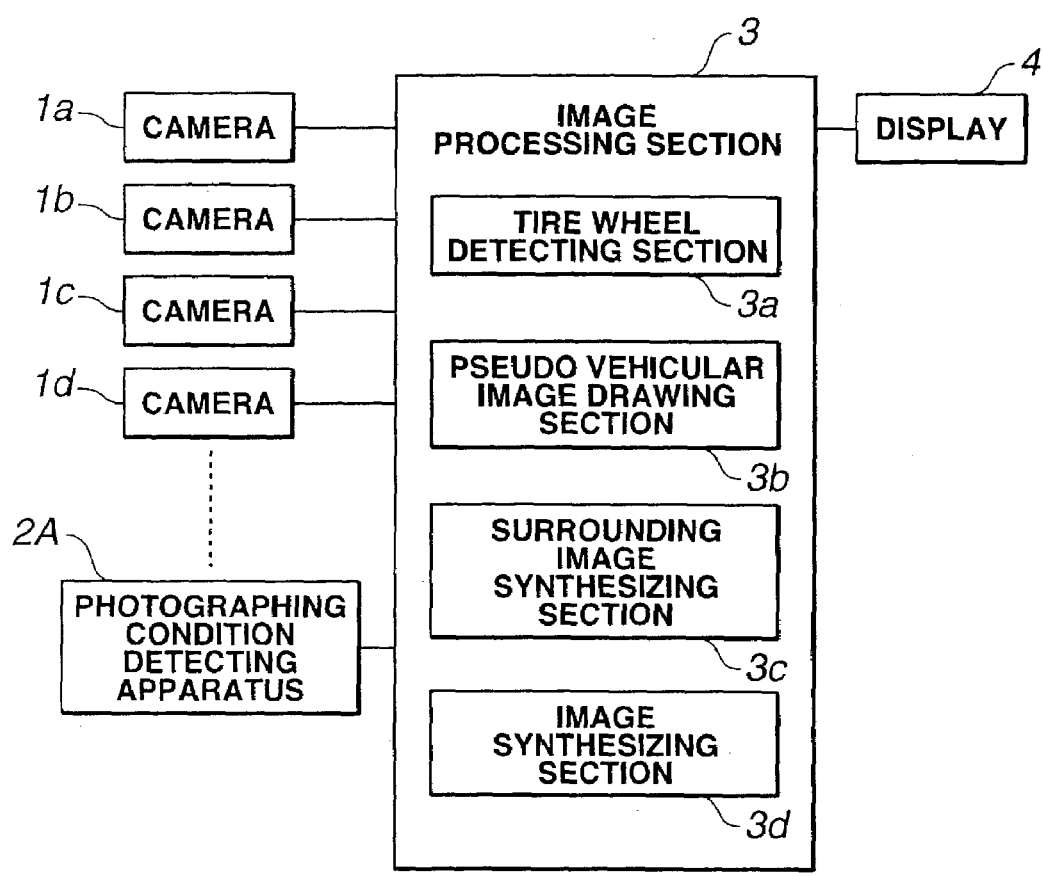
FIG. 14 is a functional block diagram of the image display apparatus for the automotive vehicle in a third preferred embodiment of the image display apparatus according to the present invention.
Figure 15:
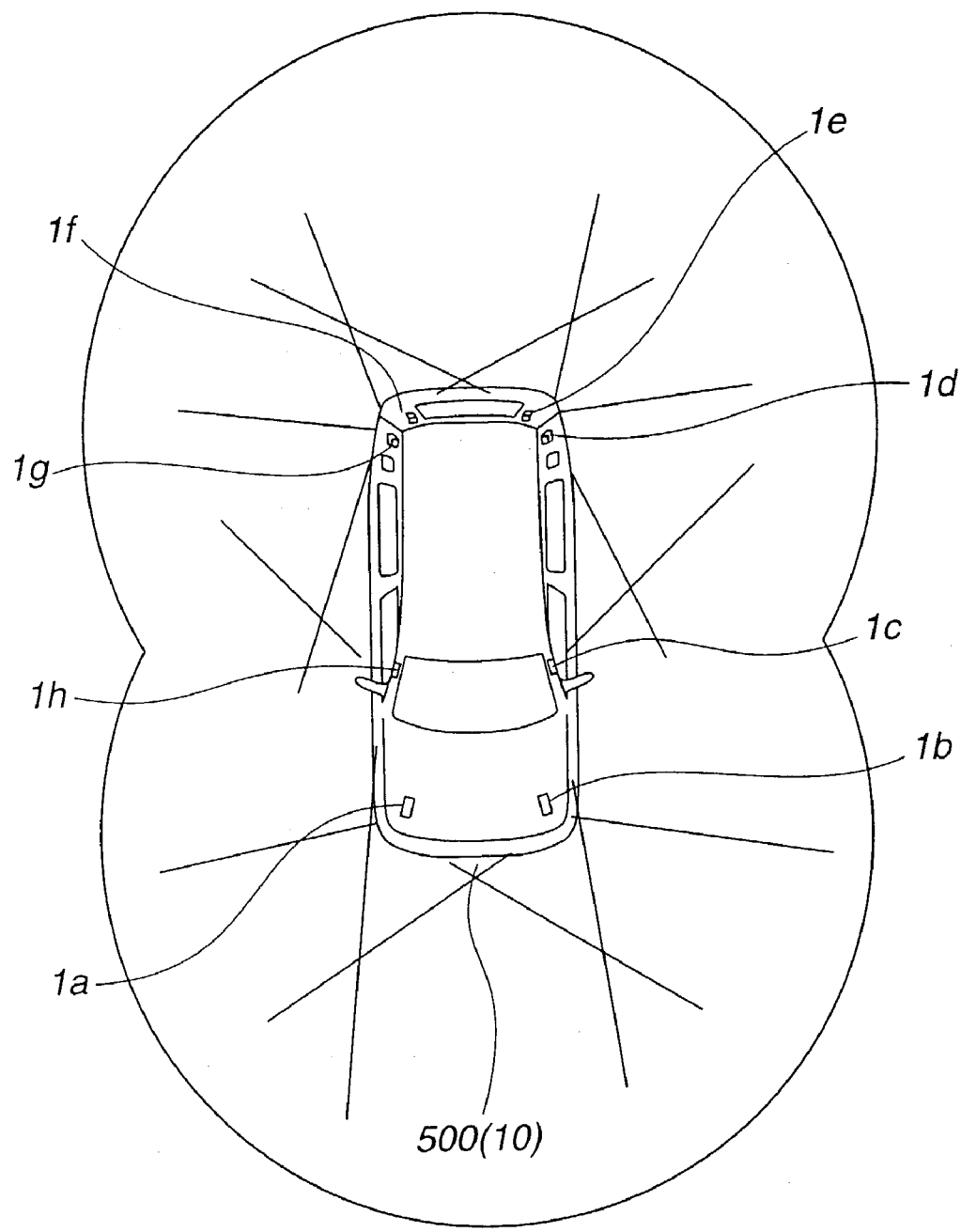
FIG. 15 is an explanatory view indicating a plurality of cameras located on a surrounding section of the vehicle.

FIG. 14 shows an arrangement of the image display apparatus in a third preferred embodiment according to the present invention. A plurality of cameras 1a, 1b, 1c, 1d, - - - are displayed on high positions of a vehicular body outer peripheral portion at appropriate spatial intervals to one another to photograph the vehicle surrounding. FIG. 15 shows an example of arrangement portions of cameras 1a through 1h. It is noted that although, in this embodiment, a photograph view angle of each camera 1a, 1b, - - - , 1h is mutually overlapped and eight cameras 1a through 1h are arranged on the vehicular (vehicle body) outer edge portion, the number of cameras and arrangement thereof to photograph the vehicular surrounding are not limited to this example of FIG. 15. In addition, the cameras 1a through 1h are arranged over the whole periphery of the vehicle to photograph the surrounding of the vehicle as shown in FIG. 15. However, the present invention is applicable to the vehicular image display apparatus in which a single camera or a plurality of cameras by which part or parts of the whole surrounding of the vehicle such as a vehicular rearward portion or a vehicular lateral side portion are photographed. Photographing condition detecting apparatus 2A detects photograph conditions of cameras 1a through 1h such as mounting locations of the cameras, directions of optical axes of photograph lens thereof, and characteristics of the photograph lens thereof. An image processing section 3 includes a microcomputer having a memory, an A/D converter and other peripheral parts, synthesizes the images of the vehicle and the surrounding of the vehicle photographed by means of the plurality of cameras 1a, 1b, 1c, 1d, - - - , and commands display 4 to display the vehicular surrounding image viewed from the upper portion of the vehicle with no image distortion. Image processing section 3, in terms of software of the microcomputer, includes: a tire wheel detecting section 3a which detects and performs the image processing for the image of the surrounding of the vehicle to detect a tire wheel of another vehicle included in the image. Pseudo vehicular image drawing section 3b draws a pseudo image (hereinafter, referred to as a pseudo vehicular image) viewed from an upper portion of the vehicle in accordance with a position of the tire wheel of the other vehicle detected by tire wheel detecting section 3a. Surrounding image synthesizing section 3c performs a perspective view transformation from the vehicular surrounding images photographed by the plurality of cameras 1a, 1b, 1c, 1d, - - - respectively into the vehicular surrounding image viewed from the viewing point above the vehicle to synthesize these vehicular surrounding images into one sheet of vehicular surrounding image. Image synthesizing section 3d synthesizes the vehicular surrounding image synthesized by surrounding image synthesizing section 3c into one sheet with the pseudo vehicular image drawn by pseudo vehicular image drawing section 3b to generate the image surrounding the vehicle.

Figure 16:
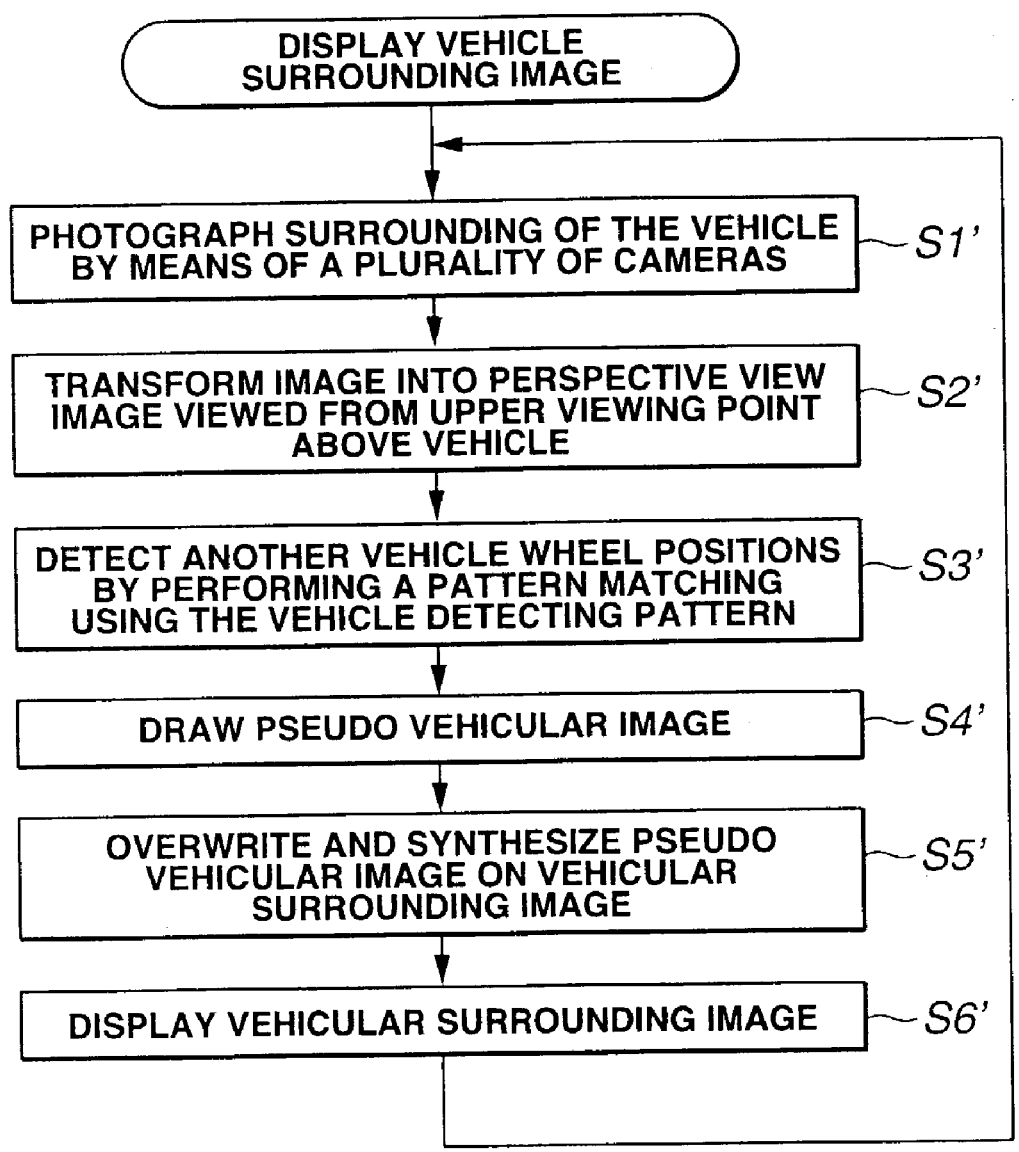
FIG. 16 is an operational flowchart for explaining a vehicular surrounding image display program executed in the image display apparatus in the third preferred embodiment according to the present invention.
Figure 17:
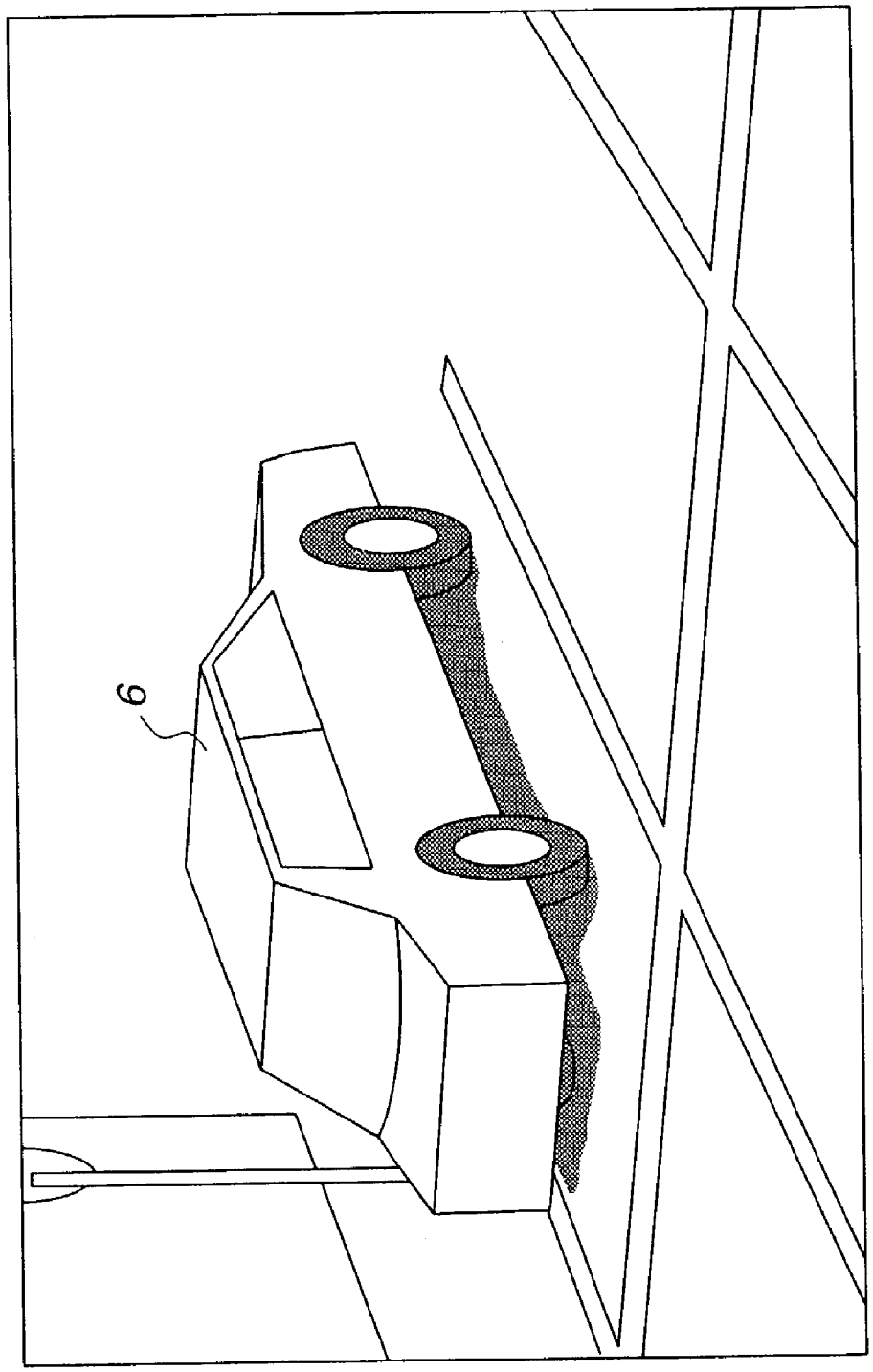
FIG. 17 is a display example of an image photographed by a camera located at a rear right side of the vehicle in a case of the third embodiment shown in FIG. 14.
Figure 18:
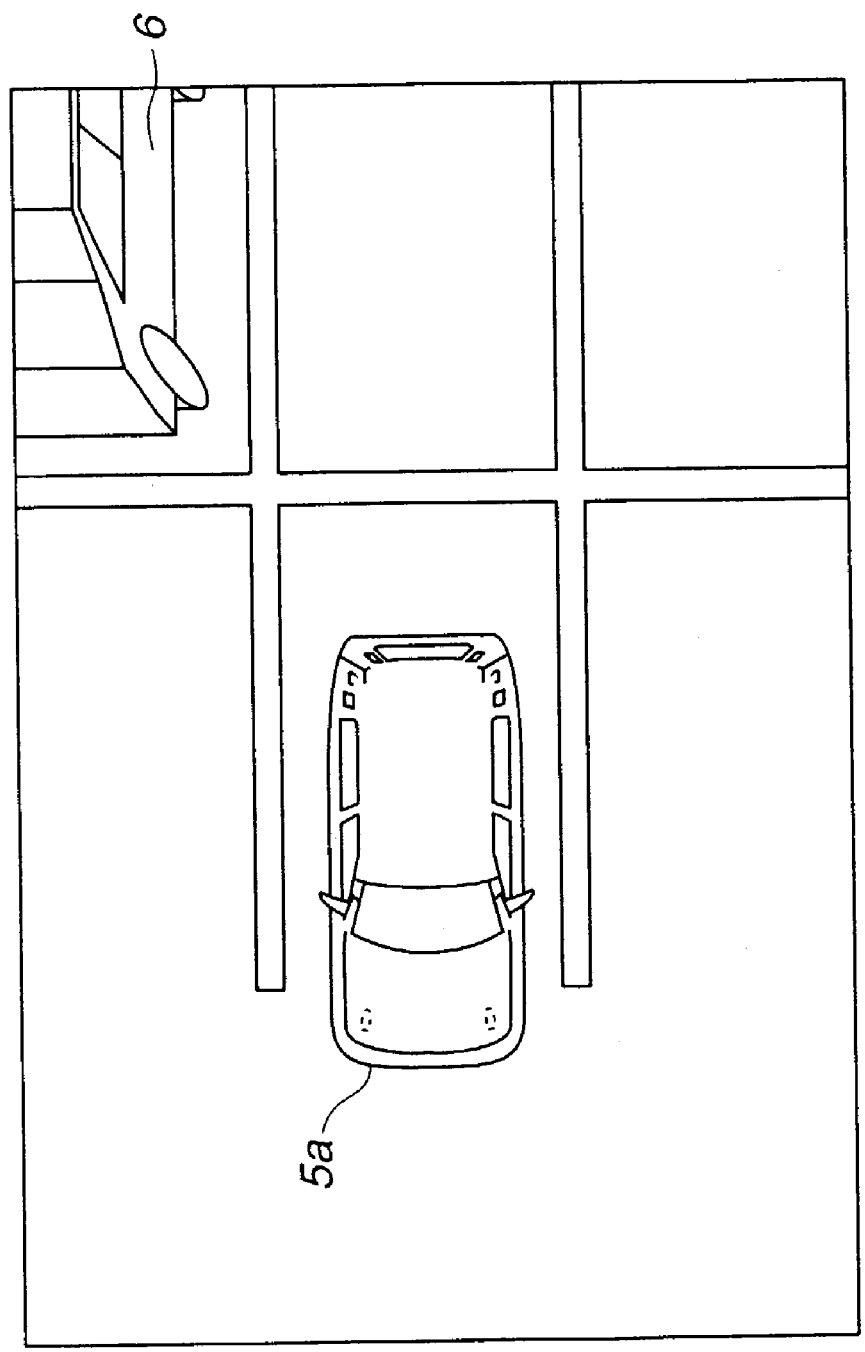
FIG. 18 is a display example of an image in which a plurality of vehicular surrounding images photographed by a plurality of cameras are perspectively transformed into the image with an upper portion of the vehicle as a viewing point and the perspectively transformed image is synthesized with a pseudo vehicular image of the vehicle in the third embodiment.

Next, an operation of the third embodiment of the image display apparatus described above will be described by referring to an example of parking the vehicle at a parking lot. FIG. 16 shows an operational flowchart representing a vehicular surrounding image display program executed by the microcomputer constituting image processing section 3. Image processing section 3 executes the program shown in FIG. 16 repeatedly whenever a power supply for image processing section 3 is turned on. At a step S1', the surrounding of the vehicle is photographed by means of cameras 1a, 1b, - - - , 1h arranged on the vehicle body outer edge portion as shown in FIG. 15. At the next step S2', surrounding image synthesizing section 3c carries out the perspective transformation from the image of the surrounding of the vehicle photographed by each camera 1a, 1b, - - - , 1h to an image viewed from the upper position of the vehicle body on the basis of the photograph conditions such as the mounting locations of the respective cameras 1a, 1b, - - - , the directions of the optical axes of the photograph lens of cameras 1a, 1b, - - - , and characteristics of photograph lens thereof detected by photographing condition detecting apparatus 2A. FIG. 17 shows a display example of an image photographed by means of one 1f of cameras 1a, 1b, - - - , 1h which is located on a rear right side of vehicle 500. As shown in FIG. 17, another vehicle 6 is parked at the rear right side of vehicle 500 (10). FIG. 18 shows a display example of the perspective view image generated from the plurality of vehicular surrounding images photographed by the plurality of cameras 1a, 1b, - - - , 1h with the upper portion of the vehicle as the viewing point and synthesized with a pseudo image 5a of vehicle 500 as a center. In FIG. 18, the image of the other vehicle 6 parked at the backward direction of the right rear side of the vehicle 500 is the image photographed by one if of the cameras 1a through 1h located at the rear right side of the vehicle body perspectively transformed and synthesized into the image viewed from the upper portion of vehicle 500. In FIG. 18, if the image of camera 1f mounted at the portion of the vehicle body near to a roof of the vehicle is transformed into the image viewed from the viewing point having a height near to an infinite point, it is not transformed into the image correctly straightly upper part of the vehicle and the image is distorted. It is noted that since the vehicle 500 itself (also called, a host vehicle in which the image display apparatus according to the present invention is mounted) is not photographed by the plurality of cameras 1a, 1b, - - - , 1h, pseudo image 5a of vehicle itself 500 is previously prepared and synthesized with the image of the surrounding of the vehicle. In this embodiment, the surrounding image of the vehicle without distortion viewed from the upper portion of the vehicle is generated as described below.

A tire (a tire portion of the tire wheel) is usually black in color and is of a characteristic shape such as a circle or ellipse in the photographed image of cameras 1a, 1b, - - - , 1h. Hence, by extracting a black portion whose shape is the circle or ellipse from the image of the surrounding of the vehicle, the tire can easily be identified. In addition, since the tire wheel within the image of the surrounding of the vehicle is viewed whose shape becomes different according to the viewing position, the position between host vehicle 500 (itself) and the other vehicle 6 can be recognized according to the shape of the tire wheel. That is to say, with tire wheel detecting patterns in accordance with the positions of the vehicular surrounding image previously generated and stored, a pattern matching on the images of the tire wheel detecting patterns and the surrounding of vehicle 500 is carried out on the vehicular surrounding image. On the basis of one of the wheel detecting patterns and the tire wheel position shape pattern which is coincident with each other, a positional relationship between the vehicle itself (500) and the other vehicle (6) can be recognized.

Figure 19:
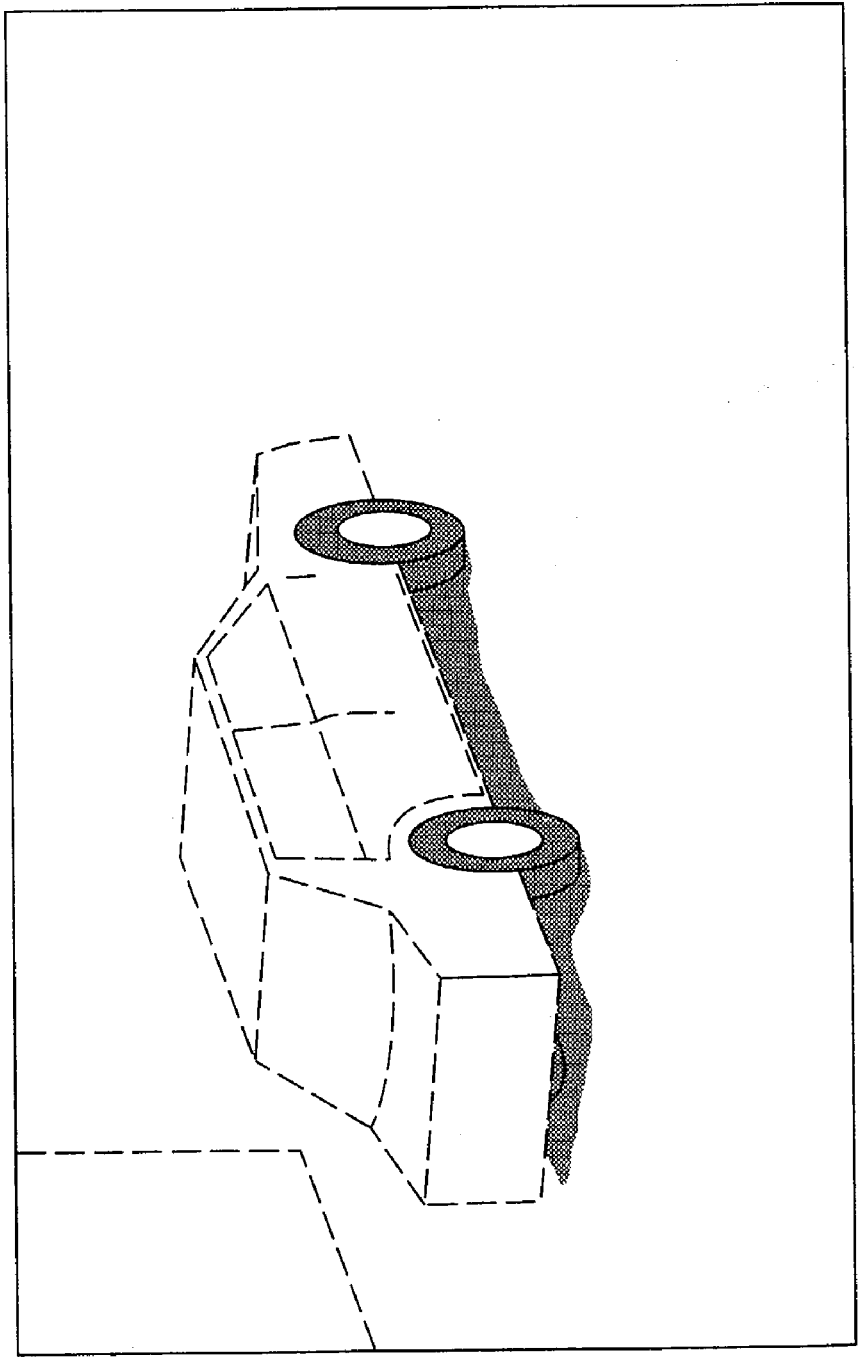
FIG. 19 is a display example of an image in which edges in a monochromatic (black-and-white) image are emphasized.

Referring back to a step S3' in FIG. 16, tire wheel detecting section 3a divides the vehicular surrounding image to be under a pattern matching into a black color system and no black color system. With the black color system kept unchanged and a system other than the black color system is changed to a white, the vehicular surrounding the image is transformed into a monochromatic (black-and-white) image. It is noted that, even if it is a black color, the black which can be identified as a metal color is set to a white color. Then, an edge of the monochromatic image after the transformation is emphasized by a certain lightness (edge emphasis) and this emphasized processed image is generated. FIG. 19 shows the display example of the monochromatic edge emphasis processed image.

As described above, since the shape of the tire of the other vehicle 6 is viewed to be varied depending upon a position thereof on the vehicular surrounding image shown in FIG. 19, the pattern matching using the tire wheel detecting patterns for each position on the vehicular surrounding image is carried out so that the tire wheel position of the other vehicle 6 with reference to the position of the vehicle itself 500 is detected. At a step S4' in FIG. 16, pseudo vehicular image drawing section 3b draws the pseudo vehicular image which matches with the tire wheel position of the other vehicle 6.

Figure 20:
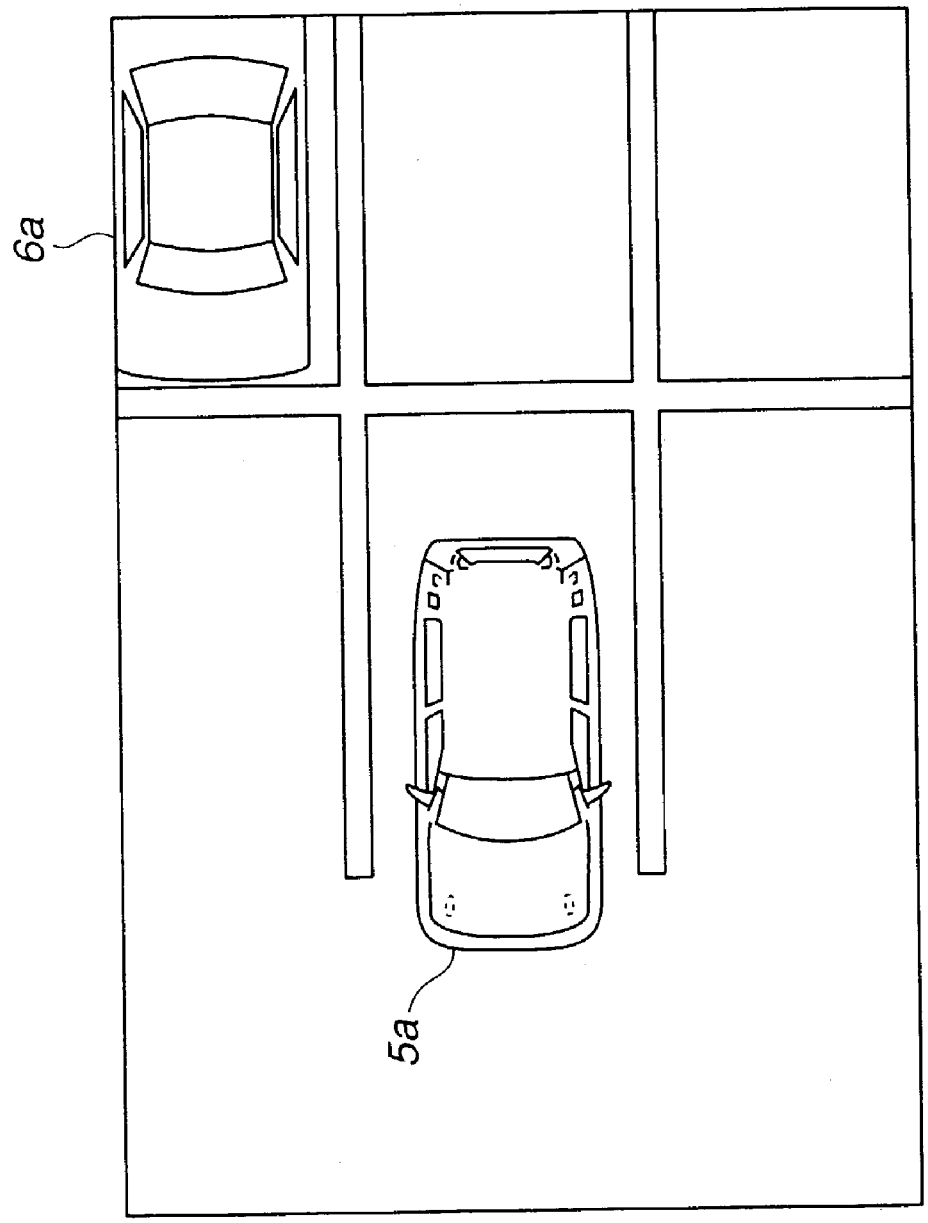
FIG. 20 is a display example of an image in which a pseudo vehicular image of another vehicle is overwritten and synthesized on the vehicular surrounding image.
Figure 21:
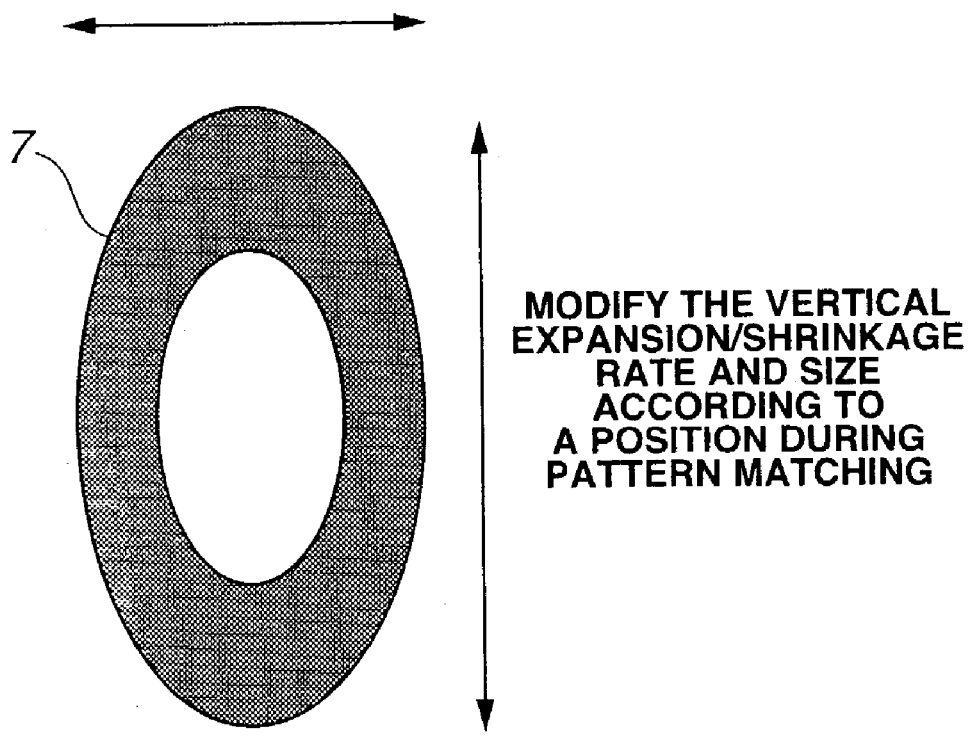
FIG. 21 is an explanatory view representing a tire wheel detecting pattern to carry out a pattern matching on the vehicular surrounding image in a case of a fourth preferred embodiment according to the present invention.

At a step S5' in FIG. 16, image synthesizing section 3d overwrites the pseudo vehicular image drawn by pseudo vehicular image drawing section 3b on the tire wheel position detected by tire wheel detecting section 3a on the image of the surrounding of the vehicle and is synthesized to generate a final vehicular surrounding image as shown in FIG. 20. In FIG. 20, 6a denotes the pseudo vehicular image drawn by pseudo vehicular image drawing section 3b as the other vehicle. If this pseudo vehicular image 6a shown in FIG. 20 is compared with the image of the other vehicle 6 shown in FIG. 18, the image of the other vehicle 6 shown in FIG. 18 is a distorted image as if it were viewed from an oblique upper portion of the other vehicle. Whereas, pseudo vehicular image 6a shown in FIG. 20 is the image viewed from the upper portion of the vehicle correctly. At the next step S6', image processing unit 3 displays the image of the synthesized vehicular surrounding image of vehicle itself 500 through display 4.

As described above, in the third embodiment, the tire wheel of other vehicle 6 is detected from the contents of the vehicular surrounding image perspectively transformed and synthesized from the viewing point above the vehicle photographed by cameras 1a, 1b, - - - , pseudo vehicular image 6a of the other vehicle 6 which matches with the tire wheel position of other vehicle 6 is drawn, and the pseudo vehicular image 6a is overwritten and displayed on the vehicular surrounding image. Therefore, the vehicular surrounding image without the image distortion of the vehicular surrounding image viewed correctly from the upper portion of the host vehicle can be displayed. Consequently, erroneous recognition of the distance and direction to the other vehicle due to the distortion of the vehicular surrounding image and unpleasant feeling given to the vehicular occupant can be avoided.

Fourth Embodiment

In the third embodiment, the integrated image photographed by the plurality of cameras located at the outer periphery of the vehicle body is perspectively transformed into the vehicular surrounding image viewed from the upper position of the vehicle and, thereafter, the pattern matching is carried out using tire wheel detecting patterns to detect the position of the tire wheel of the other vehicle. In the third embodiment of the detecting method of the tire wheel position of the other vehicle, the tire wheel detecting patterns which are distorted are needed to be prepared in accordance with the positions of the tire wheels on the vehicular surrounding image. On the other hand, in the fourth embodiment, the above-described pattern matching is carried out on the image photographed by the cameras before the perspective transformation to the image viewed from the upper portion above the vehicle. The shape (or contour) of the tire wheel of the vehicle viewed from each image photographed by the cameras is generally circular or elliptical and photographed tire wheel vertical expansion/shrinkage rate and photographed tire wheel size are related to a photograph distance, viz., the distance from the tire wheel to the vehicle (itself) 500. Hence, the vertical expansion (shrinkage) rate and size of the tire wheel shape are varied in accordance with the position on the photographed image by each camera. In addition, a horizontal (left and right) expansion/shrinkage rate of the tire wheel shape is varied in accordance with a gradient of the vehicle with respect to a vertical direction on the image. Therefore, in the fourth embodiment, a plurality of tire wheel detecting patterns whose vertical expansion/shrinkage rate and the size of the tire wheel are varied in accordance with vertical positions of the tire wheels on the image photographed by each camera 1 (1a, 1b, - - - , 1h). The pattern matching is carried out in such a way that one of the tire wheel detecting patterns which corresponds to the tire wheel position on the image photographed by each camera is selected while the horizontal expansion/shrinkage rate of each tire wheel detecting pattern is varied in accordance with the gradient of the vehicle. In the fourth embodiment, using such tire wheel detecting patterns described above, the pattern matching is carried out on the image photographed by the camera, as shown in FIG. 22, to detect the tire wheel position of the other vehicle.

Figure 22:
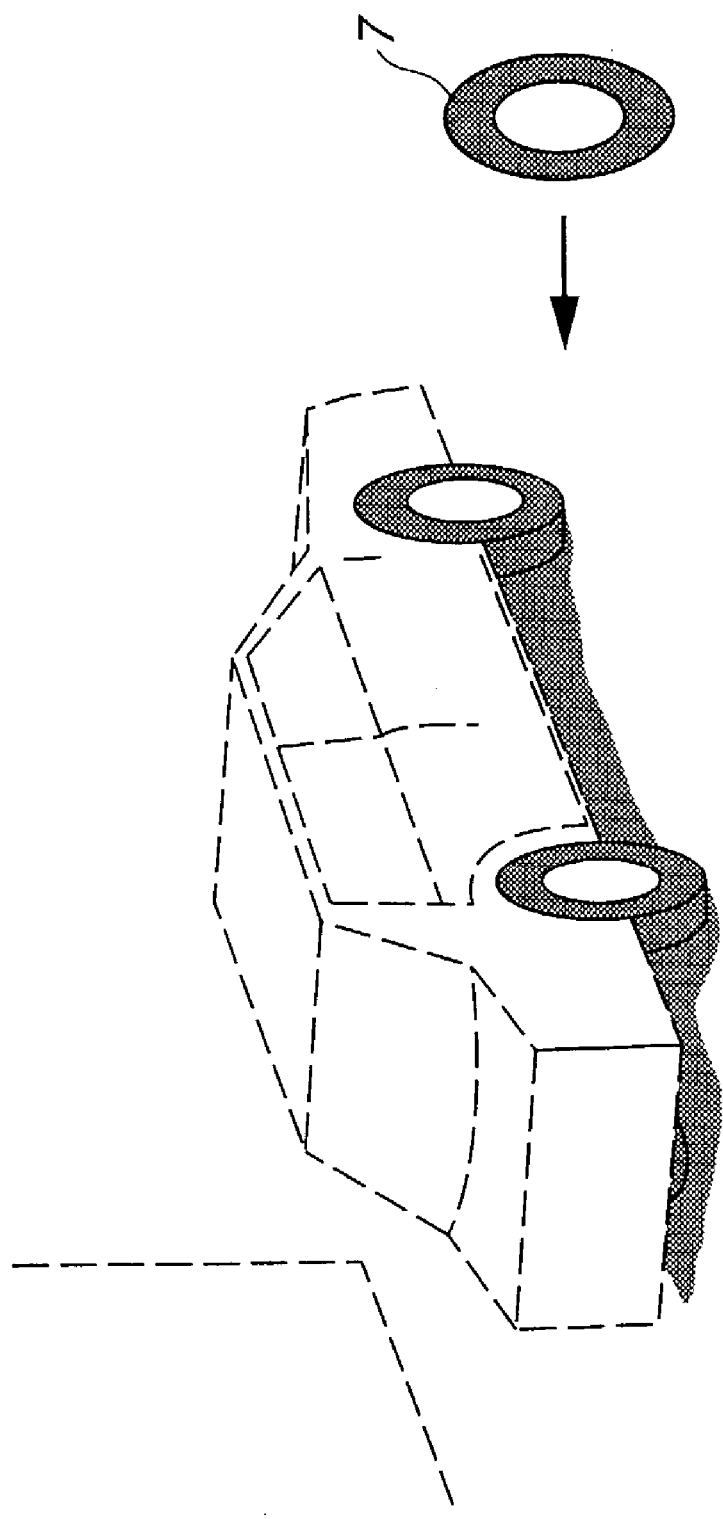
FIG. 22 is an explanatory view for explaining a method of carrying out a pattern matching on the image photographed by a camera.

It is noted that, in an example shown in FIG. 22, the image photographed by the camera to be subjected to the pattern matching is divided into the black color system and the system other than the black color system, with the black system left unchanged (black) and with no black color system changed to the white color so that the monochromatic image (black-and-white) is converted. An image on which an edge of the monochrome image is emphasized to a certain lightness difference is generated. On the image, the tire wheel position of the other vehicle is detected using each tire wheel detecting pattern adopted in the fourth embodiment.

Figure 23:
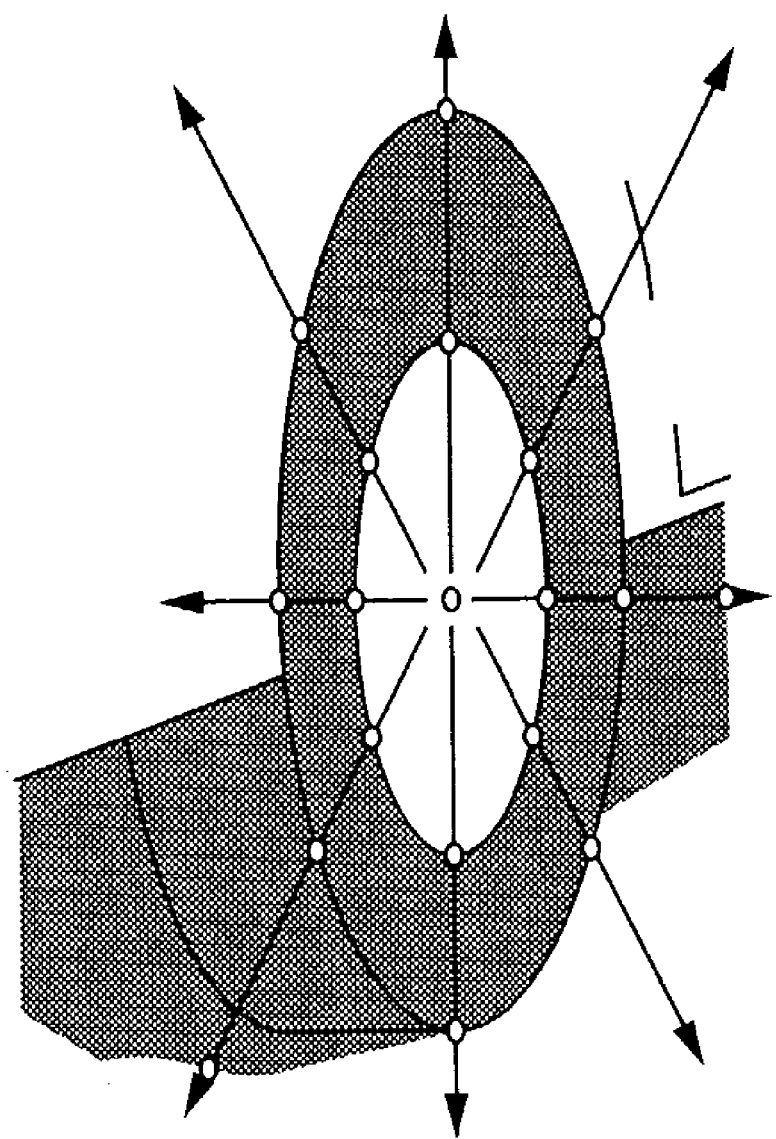
FIG. 23 is an explanatory view for explaining a method of detecting a tire wheel on the vehicular surrounding image.

In the fourth embodiment, the tire wheel detecting pattern in accordance with each position on the photographed image by each camera is used in accordance with the detected tire wheel position and the pattern matching is carried out while varying the horizontal expansion/shrinkage rate of the wheel detecting pattern in accordance with the gradient of the vehicle. Hence, as compared with the third preferred embodiment in which the pattern matching is carried out on the vehicular surrounding image after the perspective transformation for the image photographed by each camera and viewed from the upper end of the vehicle, the position of the tire wheel of the other vehicle can accurately be detected. The operation other than the detecting method of the tire wheel position is the same as described in the third embodiment and its explanation will herein be omitted. In each of the third and fourth embodiments, the tire wheel shape on the image on which the pattern matching is carried out, as shown in FIG. 19, is of a circle or an ellipse. Hence, as shown in FIG. 23, as the edge is being detected in a radial direction from a detection point on the image, two concentric edges are detected. When these edge shapes satisfy the condition of the tire wheel, these shaped images are deemed to be the tire wheel. In addition, a wheel base of another vehicle can be recognized according to the tire wheel position of the other vehicle detected by tire wheel detecting section 3*a*, pseudo vehicular image drawing section 3*b* draws the pseudo vehicular image which matches with the wheel base of the other vehicle and overwrites the pseudo vehicular image on the vehicular surrounding image by means of image synthesizing section 3*d* shown in FIG. 14 so that the image of the other vehicle which is approximate to an actual dimension and shape can be displayed. It is noted that, in each of the third and fourth embodiments, there is a possibility that an actual distorted vehicle is larger than the pseudo vehicular image and the vehicle is overflowed (or projected) from the pseudo vehicular image. Thus, at this time, such a pseudo vehicular image that its whole length (vehicular longitudinal length) is longer than an average whole length which would be considered from the wheel base of the other vehicle is drawn so that the image of the other vehicle which is actually distorted can be prevented from being overflowed (or projected) and displayed from the pseudo vehicular image. It is noted that, even if such a projection as described above is present to some degree, the whole length of the other vehicle parked at a lateral side of the vehicle does not disturb a parking operation of the vehicle itself (host vehicle). Hence, no problem arises.

In addition, for another vehicle which is parked at either a front area or a rear area of the vehicle itself (so-called, the host vehicle), each body color of this other vehicle and the pseudo vehicular image is set to be the same. Hence, even if the image of the actually distorted other vehicle is overflowed (projected) from the pseudo vehicular image and displayed, no un-match (difference or unpleasant) feeling is given to a vehicular occupant.

Cameras 1*a*, 1*b*, 1*c*, 1*d*, - - - constitute photographing means, image processing section 3 constitute perspective view transforming means, another vehicle detecting means, pseudo vehicular image drawing means, and image synthesizing means. Display 4 constitutes display means. It is noted that although, in the whole specification, the term of superposition is used, the term of the superposition has the same meaning as a term of superimpose.

Various changes and modifications may be made without departing from the sprit and scope of the present invention which is to be defined in the appended claims.

The entire contents of two Japanese Patent Applications No. 2002-151143 (filed in Japan on May 24, 2002) and No. 2002-116039 (filed in Japan on Apr. 18, 2002) are herein incorporated by reference. The scope of the invention is defined with reference to the following claims.

What is claimed is:

1. An image display apparatus for an automotive vehicle, comprising:

a photographing section that photographs a field near the vehicle, the photographing section including a plurality of cameras disposed to photograph respective fields near the vehicle;

a display image generating section that includes an image synthesizing section configured to synthesize video images photographed by the plurality of cameras and that generates a top view display image looking down a whole part of the vehicle through an approximately vertical angle from a first viewing point on an upper sky of the vehicle and bird's eye view display images looking down the whole part of the vehicle through a predetermined looking-down angle from a second viewing point at which the first viewing point is moved toward a front portion of a vehicular running direction and from a third viewing point at which the first viewing point is moved toward a backward portion of the vehicular running direction;

a display section configured to display one of the images generated by the display image generating section;

a display image switching section that switches the displayed image to another one of the generated display images; and a running information receiving section that receives running information of the vehicle, the display image switching section switches the displayed image in accordance with the received information of the vehicle;

wherein:

the running information receiving section is configured to receive the running information related to a detected direction toward which the vehicle moves; and the display image switching section is configured to switch the displayed image from a bird's eye view image when the vehicle is running in a forward direction, to a top view image when the vehicle is running in a backward direction.

2. An image display apparatus for an automotive vehicle as claimed in claim 1, wherein:

the image display apparatus further comprises a running information receiving section that receives running information of the vehicle;

the display images include a top view image and a bird's eye view image, the running information receiving section receives the running information related to a history of vehicle movements, and the display image switching section switches the displayed image from a bird's eye view image when the vehicle stops after moving in a forward direction to a top view image when the vehicle stops after moving in a backward direction.

3. An image display apparatus for an automotive vehicle as claimed in claim 1, wherein:

the images generated by the display image generating section include a top view image and a bird's eye view image, the running information receiving section receives the running information related to a velocity of the vehicle, the display image switching section switches the displayed image to a bird's eye view image when the vehicle is running at a speed no less than a predetermined value, and switches the display image to display a top view image when the vehicle is running at a speed lower than the predetermined value.

4. An image display apparatus for an automotive vehicle as claimed in claim 1, wherein the running information receiving section receives the running information related to a vehicular running status from a shift position sensor to detect a shift position of the vehicle or a vehicular velocity sensor to detect a vehicular running velocity.

5. An image display apparatus for an automotive vehicle as claimed in claim 1, wherein:
the display image generating section further comprises a command reception section that receives an external switch command, and
the display image switching section switches the display image displayed through the display section to one of a top view image and a bird's eye view image based on the external switch command.

6. An image display apparatus for an automotive vehicle as claimed in claim 5, wherein the display image switching section switches the display image displayed through the display section to one of the top view image and the bird's eye view image in accordance with the switch command received by the command reception section and the running information received by the running information receiving section.

7. An image display apparatus for an automotive vehicle as claimed in claim 6, wherein:
the command reception section receives one of first, second, and third commands,
the first command is a command to display the bird's eye view image through the display section when the vehicle is running in a forward direction and to display the top view image through the display section when the vehicle is running in a backward direction,
the second command is a command to display the top view image through the display section when the vehicle is running in the forward direction and to display the bird's eye view image through the display section when the vehicle is running in the backward direction, and
the third command is a command to display one of the top view image and the bird's eye view image through the display section irrespective of a vehicular running status.

8. An image display apparatus for an automotive vehicle as claimed in claim 1 further comprising a superposing section that superposes at least one of vehicular graphic data projected from a respective viewing point toward the vehicle, arrow mark graphic data indicating a direction toward which the vehicle moves, and a grid line indicating a reference line.

9. An image display apparatus for an automotive vehicle, comprising:
a photographing section that photographs a field near the vehicle;
a display image generating section that generates a plurality of display images based on photographed data supplied from the photographing section, each of the plurality of display images having a different viewing point and a looking down angle;
a display section configured to display one of the display images generated by the display image generating section;
a display image switching section that switches the displayed image to another one of the display images;
a surrounding vehicle detecting section that detects a surrounding vehicle near the vehicle based on the photographed data; and
a pseudo vehicular image drawing section configured to draw a pseudo vehicular image,
wherein at least one of the display images is synthesized with the pseudo vehicular image,
wherein:
the display image generating section comprises a perspective view transforming section that transforms a respective display image into a perspective view image, and
the surrounding vehicle detecting section detects a wheel of another vehicle based on at least one of a vehicular surrounding image generated by the perspective view transforming section and a vehicular surrounding image photographed by the photographing section to detect a position of the other vehicle.

10. An image display apparatus for an automotive vehicle as claimed in claim 9, wherein the pseudo vehicular image drawing section estimates a wheel base of the other vehicle based on a position of the wheel detected by the surrounding vehicle detecting section and draws the pseudo vehicular image matching the estimated wheel base.

11. An image display apparatus for an automotive vehicle as claimed in claim 10, wherein the pseudo vehicular image drawing section draws the pseudo vehicular image having a longitudinal length longer than that of the other vehicle corresponding to the estimated wheel base.

12. An image display apparatus for an automotive vehicle as claimed in claim 9, wherein the pseudo vehicular image drawing section draws the pseudo vehicular image having the same body color as another vehicle which is located at a front or rear area of the vehicle.

13. An image display apparatus for an automotive vehicle, comprising:
photographing means for photographing a field near the vehicle, the photographing section including a plurality of cameras disposed to photograph respective fields near the vehicle;
display image generating means including an image synthesizing section configured to synthesize video images photographed by the plurality of cameras, for generating a top view display image looking down a whole part of the vehicle through an approximately vertical angle from a first viewing point on an upper sky of the vehicle and bird's eye view display images looking down the whole part of the vehicle through a predetermined looking-down angle from a second viewing point at which the first viewing point is moved toward a front portion of a vehicular running direction and from a third viewing point at which the first viewing point is moved toward a backward portion of the vehicular running direction;
display means through which one of the display images generated by the display image generating means is displayed;
display image switching means for switching the displayed image generated by the display image generating means and displayed through the display means to another one of the display images; and
a running information receiving section that receives running information of the vehicle, the display image switching section switches the displayed image in accordance with the received information of the vehicle;
wherein:
the running information receiving section is configured to receive the running information related to a detected direction toward which the vehicle moves; and
the display image switching section is configured to switch the displayed image from a bird's eye view image when the vehicle is running in a forward direction, to a top view image when the vehicle is running in a backward direction.

14. An image display method for an automotive vehicle, comprising:

generating images of respective fields near the vehicle by using a plurality of cameras disposed to photograph the respective fields near the vehicle;

synthesizing the video images;

receiving running information related to a running status of the vehicle;

generating a top view display image looking down a whole part of the vehicle through an approximately vertical angle from a first viewing point on an upper sky of the vehicle and bird's eye view display images looking down the whole part of the vehicle through a predetermined looking-down angle from a second viewing point at which the first viewing point is moved toward a front portion of a vehicular running direction and from a third viewing point at which the first viewing point is moved toward a backward portion of the vehicular running direction; and switching the displayed image to another one of the generated display images in accordance with the running information;

wherein:

the running information relates to a detected direction toward which the vehicle moves; and the displayed image is switched from a bird's eye view image when the vehicle is running in a forward direction, to a top view image when the vehicle is running in a backward direction.

15. An image display method for an automotive vehicle, comprising:

generating images of respective fields near the vehicle using a plurality of cameras disposed to photograph the respective fields near the vehicle;

synthesizing the video images;

generating a top view display image looking down a whole part of the vehicle through an approximately vertical angle from a first viewing point on an upper sky of the vehicle and bird's eye view display images looking down the whole part of the vehicle through a predetermined looking-down angle from a second viewing point at which the first viewing point is moved toward a front portion of a vehicular running direction and from a third viewing point at which the first viewing point is moved toward a backward portion of the vehicular running direction;

displaying one of the generated images;

switching the displayed image to another one of the generated images, wherein the displayed image is switched from a bird's eye view image when the vehicle is running in a forward direction, to a top view image when the vehicle is running in a backward direction;

detecting a surrounding vehicle near the vehicle from the photographed data;

drawing a pseudo vehicular image; and synthesizing the pseudo vehicle image with one of the images.

16. An image display program for a computer of an automotive vehicle, when executed by the computer, controlling the computer to:

receive images of respective fields near the vehicle obtained by a plurality of cameras disposed to photograph the respective fields near the vehicle;

synthesize images obtained by the plurality of cameras;

receive running information related to a vehicular running status, wherein the running information relates to a detected direction toward which the vehicle moves;

generate a top view display image looking down a whole part of the vehicle through an approximately vertical angle from a first viewing point on an upper sky of the vehicle and bird's eye view display images looking down the whole part of the vehicle through a predetermined looking-down angle from a second viewing point at which the first viewing point is moved toward a front portion of a vehicular running direction and from a third viewing point at which the first viewing point is moved toward a backward portion of the vehicular running direction;

display the generated display image; and switching the displayed image from a bird's eye view image when the vehicle is moving in a forward direction, to a top view image when the vehicle is moving in a backward direction.

17. An image display apparatus for an automotive vehicle, comprising:

a plurality of cameras disposed to photograph respective fields near the vehicle;

a vehicular running state obtaining section that obtains a vehicular running state;

a display image generating section that generates a top view display image looking down a whole part of the vehicle through an approximately vertical angle from a first viewing point on an upper sky of the vehicle and bird's eye view display images looking down the whole part of the vehicle through arbitrary looking-down angles and from arbitrary viewing points at which the first viewing point is moved toward front and backward portions of a vehicular running direction in accordance with the vehicular running state;

a display section configured to display one of the images generated by the display image generating section in accordance with the vehicular running state; and a display image switching section that switches the displayed image to another one of the generated display images, wherein the displayed image is switched from a bird's eye view image when the vehicle is moving in a forward direction, to a top view image when the vehicle is moving in a backward direction.

* * * * *